(12) United States Patent
Buelow, II et al.

(10) Patent No.: US 7,198,398 B2
(45) Date of Patent: Apr. 3, 2007

(54) ADJUSTABLE-AIM LIGHT PIPE FIXTURE

(75) Inventors: Roger F. Buelow, II, Gates Mills, OH (US); John M. Davenport, Middleburg Heights, OH (US); Gregory P. Frankiewicz, Mayfield Heights, OH (US); Dave Bina, Northfield Center, OH (US)

(73) Assignee: Fiberstars, Inc., Solon, OH (US)

( * ) Notice: Subject to any disclaimer, the term of this patent is extended or adjusted under 35 U.S.C. 154(b) by 0 days.

(21) Appl. No.: 11/172,555

(22) Filed: Jun. 30, 2005

(65) Prior Publication Data
US 2006/0002136 A1    Jan. 5, 2006

Related U.S. Application Data

(60) Provisional application No. 60/584,359, filed on Jun. 30, 2004.

(51) Int. Cl.
*A41F 1/00* (2006.01)
*A61M 1/00* (2006.01)
*F21V 5/00* (2006.01)
*F21V 17/00* (2006.01)
*G02B 6/00* (2006.01)
*G02B 6/36* (2006.01)

(52) U.S. Cl. .................... 362/581; 362/319; 362/554; 362/576; 362/571

(58) Field of Classification Search ............. 362/269, 362/285, 287, 319, 551, 554, 576, 581
See application file for complete search history.

(56) References Cited

U.S. PATENT DOCUMENTS

| 3,912,918 | A | * | 10/1975 | Feinbloom | 362/581 |
| 5,050,047 | A | * | 9/1991 | Viner et al. | 362/552 |
| 5,999,686 | A | * | 12/1999 | Leaman | 385/147 |
| 6,371,628 | B1 | | 4/2002 | Ward | |
| 7,011,439 | B1 | * | 3/2006 | Kane et al. | 362/554 |

OTHER PUBLICATIONS

"FE-2211, Fiberscent, Adjustable Aim," published by Fiberstars Inc., Fremont CA (1 Page) from http://www.fiberstars.com/cl/prods/fixts/clFixtsSpecSheet.asp?ID=84, visited and printed on Sep. 12, 2005, admitted as prior art.

(Continued)

*Primary Examiner*—Sandra O'Shea
*Assistant Examiner*—Jason Moon Han
(74) *Attorney, Agent, or Firm*—Charles E. Bruzga; Bruzga & Associates

(57) ABSTRACT

An adjustable-aim light pipe fixture, comprising a generally spherical eyeball for receiving an end of a light pipe is disclosed. The eyeball has a longitudinal axis coincident with a longitudinal axis of that portion of the light pipe that is received in the eyeball. A socket holds the eyeball. The socket comprises a first retainer ring and a second retainer ring. Each retainer ring has an interior surface with contact points to an outer surface of the eyeball. The first and second retainer rings are oriented with respect to each other so as to hold the eyeball in a fixed position when the first and second rings are pressed towards each other. Clamping structure clamps the first and second rings against each other in such manner as to hold the eyeball in fixed relation to the first retainer ring.

24 Claims, 21 Drawing Sheets

OTHER PUBLICATIONS

"FE-1604, Futura, Adjustable Aim, Beveled Trim," published by Fiberstars Inc., Fremont CA (1 Page) from http://www.fiberstars.com/cl/prods/fixts/clFixtsSpecSheet.asp?ID=83, visited and printed on Sep. 12, 2005, admitted as prior art.

"CRE 1001 Lensed Fully Asjustable," published by Fiberstars Inc., Fremont CA (1 Page) from http://www.fiberstars.com/cl/prods/fixts/clFixtsSpecSheet.asp?ID=78, visited and printed on Sep. 12, 2005, admitted as prior art.

"LBM061001251 Caselight 1," published by Fiberstars Inc., Fremont CA (1 Page) from http://www.fiberstars.com/cl/prods/fixts/clFixtsSpecSheet.asp?ID=307, visited and printed on Sep. 12, 2005, admitted as prior art.

"LBM06100624 Caselight 5," published by Fiberstars Inc., Fremont CA (1 Page) from http://www.fiberstars.com/cl/prods/fixts/clFixtsSpecSheet.asp?ID=312, visited and printed on Sep. 12, 2005, admitted as prior art.

RSA Lighting "ComboLight CO Series Trim Catalog," (25 Pages) from http://www.rsalighting.com/combocatalog.htm#co, visited and printed on Sep. 12, 2005, admitted as prior art.

RSA Lighting "ComboLight CO Series Trimless Catalog," (27 Pages) from http://www.rsalighting.com/combocatalog.htm#covisited and printed on Sep. 12, 2005, admitted as prior art.

RSA Lighting "ComboLight LV Series Trimless Catalog," (10 Pages) from http://www.rsalighting.com/combocatalog.htm#co, visited and printed on Sep. 12, 2005, admitted as prior art.

RSA Lighting "ComboLight GR Series Catalog," (4 Pages) from http://www.rsalighting.com/combocatalog.htm#co, visited and printed on Sep. 12, 2005, admitted as prior art.

RSA Lighting "ComboLight Galleria Series Catalog," (20 Pages) from http://www.rsalighting.com/combocatalog.htm#co, visited and printed on Sep. 12, 2005, admitted as prior art.

RSA Lighting "ComboLight Continuous Channel," (28 Pages) from http://www.rsalighting.com/combocatalog.htm#co, visited and printed on Sep. 12, 2005, admitted as prior art.

RSA Lighting "ComboLight Combo Clouds," (11 Pages) from http://www.rsalighting.com/combocatalog.htm#co, visited and printed on Sep. 12, 2005, admitted as prior art.

\* cited by examiner

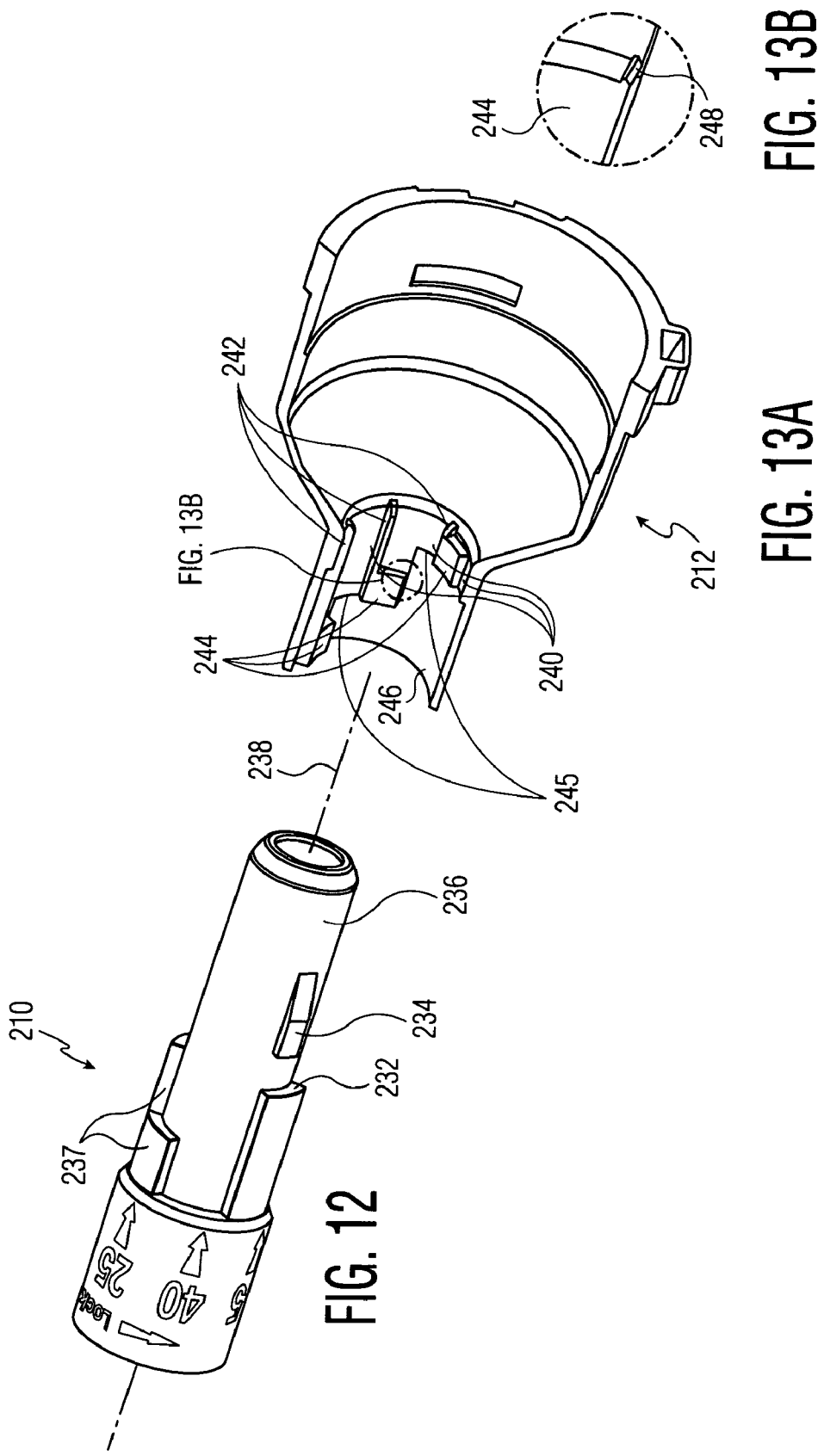

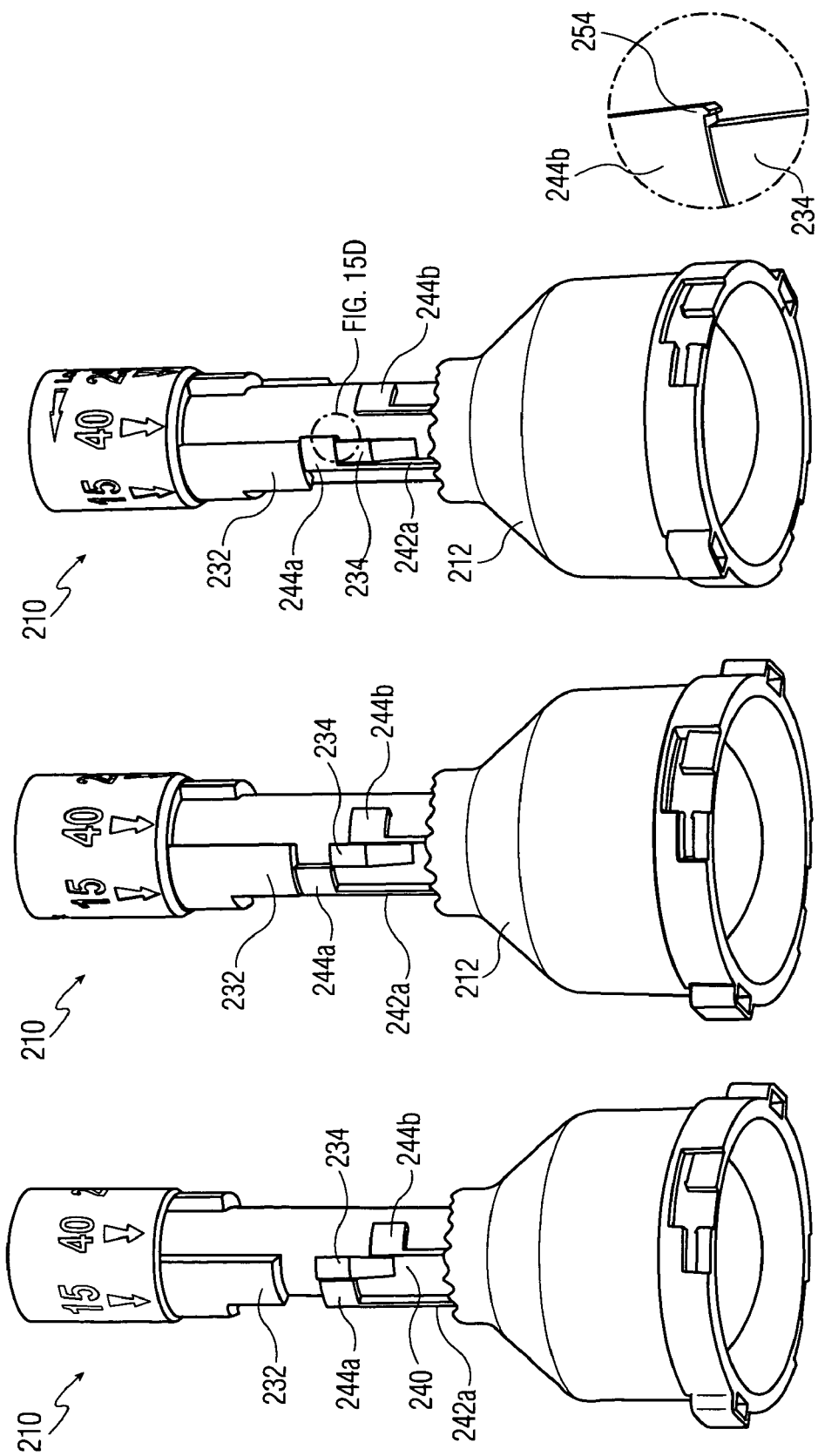

ADJUSTABLE-AIM LIGHT PIPE FIXTURE

This application claims priority from U.S. Provisional Application No. 60/584,359, filed on Jun. 30, 2004.

CROSS REFERENCE TO RELATED APPLICATION

The present application is related to U.S. application Ser. No. 10/793,049, filed Mar. 4, 2004, entitled Light Pipe Fixture, by the same inventors as the present inventors.

FIELD OF THE INVENTION

The present invention relates to fixtures for a light pipe with various features to allow for the fixture to be precisely aimed, for instance.

BACKGROUND OF THE INVENTION

A variety of arrangements have been proposed in the prior art for adjusting the orientation of a fiber optic lighting fixture after the fixture has been mounted in place. The arrangements typically involve either a gimbaled sphere that can be locked in place onto either a mounting frame or another gimbal, or a spherical eyeball that is captured between a flange and a retention means, which requires an adjusting tool to adjust the eyeball after the eyeball is captured. Such fixtures might possibly allow for minimally sufficient friction force in the fixture to overcome the weight and leveraging of a large diameter, monofilament fiber optic cable. However, these alternatives make access to the eyeball for adjustment of the light after the fixture has been mounted in place nearly impossible or very difficult without access to behind a mounting frame or some sort of unique adjustment tool. Necessitating the use of a unique adjustment tool not only complicates the fixture by requiring a separate, non-readily available tool to adjust the fixture after final adjustments, but it also does not facilitate adjustment of the fixture at-will unless the adjustment tool is available.

A problem that exists with currently available eyeball fixtures is the inability to capture the eyeball between a retention means that is strong enough to firmly lock the eyeball in place (1) without rotating the eyeball within the socket during capture, (2) without damaging the finish on the eyeball, or (3) without deforming the eyeball.

Another problem that exists with currently available fixtures is the inability to easily adjust the fixture, in a reliable or accurate manner, at some future time after firmly positioning the fixture after final adjustments. This difficulty is exacerbated with fiber optic fixtures, since the forces within the fiber tend to move the fixture out of adjustment over time as the fiber curves away from the fixture or the fixture moves out of adjustment during capture of the eyeball within a retention means. This is especially true for large diameter glass-core fiber, and large diameter, solid-core plastic fibers, which can be particularly rigid. Some of the currently available fixtures attempt to solve this problem by the inclusion of a strain relief above the fixture. However, inclusion of a strain relief tends to increase the total fixture height and precludes the use of such fixtures in low-clearance areas.

Another problem that may attribute to the inability to easily adjust a fixture, such as an eyeball fixture, after installation is the amount of pressure that a retaining means places on the eyeball in order to retain the eyeball firmly in place with respect to a retention means. This pressure presents two issues.

First, this pressure needs to be countered by a force applied by the user in order to adjust the eyeball after installation. One possible solution to this problem is the use of an adjustment tool that can lock into place on an output area of the eyeball. However, as stated previously, this solution complicates use of the fixture. In addition, this solution does not create an aesthetically pleasing eyeball surrounding the eyeball's output area because of the need for the eyeball to receive such an adjustment tool either, for example, by housing threads or sockets on the output area surrounding the eyeball.

Second, this pressure may create a large amount of friction between the eyeball and a circular opening, during adjustment of the eyeball position, which would result in more dragging and deformation of the eyeball. One possible solution to this is insertion of a ring, interposed between a retaining means and the eyeball that is made of a lubricious material. However, such material is susceptible to creep or "cold flow" over time, especially when under pressure. Additionally, because such material has innately low frictional forces, an installer would need to exert a greater amount of force on the retention means in order to properly lock the eyeball into place. This not only makes it more difficult for the installer to lock the fixture, but the greater compression force applied on the plastic ring speeds up the cold flow of the plastic. Furthermore, this solution complicates use and manufacture of the fixture.

A significant problem that exists with currently available fixtures that use fiber optics is creation of torque within the fiber due to adjustment of the fixture. If the optics and fiber mounting are part of the fixture itself or if the fiber is securely attached within the fixture itself, then as the aim of the installed fixture is rotated and/or adjusted from below, large amounts of torque can build up within the fiber that can cause the fiber to lose light or fail. This build-up of torque may also contribute to the earlier described problem of moving the fixture out of adjustment over time or during capture of the eyeball within a retention means. Additionally, built-up torque in the system might move the entire fixture out of alignment or possibly push the fixture outwards and away from a ceiling upon which the fixture is mounted, creating a gap between the fixture's mounting frame and the ceiling.

Furthermore, currently available adjustable fixtures do not look aesthetically similar to the down light, wall wash, or accent fixtures with which the adjustable fixtures are designed to compete. Some adjustable fixtures involve a gooseneck or an eyeball that does not have a smooth, aesthetic, simple surface at the output end.

It would, therefore, be desirable to provide an adjustable-aim light pipe fixture that avoids some or all of the foregoing problems.

SUMMARY OF THE INVENTION

An exemplary embodiment of the invention provides an adjustable-aim light pipe fixture, comprising a generally spherical eyeball for receiving an end of a light pipe. The eyeball has a longitudinal axis coincident with a longitudinal axis of that portion of the light pipe that is received in the eyeball. A socket holds the eyeball. The socket comprises a first retainer ring and a second retainer ring. Each retainer ring has an interior surface with contact points to an outer surface of the eyeball. The first and second retainer rings are oriented with respect to each other so as to hold the eyeball in a fixed position when the first and second rings are pressed towards each other. Clamping structure clamps the first and second rings against each other in such manner as to hold the eyeball in fixed relation to the first retainer ring.

The foregoing light pipe fixture can be easily adjusted, while reliably holding a desired aim of the light fixture. In fact, in one embodiment, a user can adjust the aim of the fixture from below the fixture with a common screwdriver. The foregoing embodiment minimizes damage or deformation to the surface of the eyeball, while a preferred embodiment avoids damage or deformation to the surface of the eyeball. A preferred embodiment provides torque relief to a fiber optic cable providing light to the light fixture. Further, embodiments of the invention can easily be made to resemble conventional down light, wall wash, or accent fixtures of the non-fiber optic type.

BRIEF DESCRIPTION OF THE DRAWINGS

FIG. 12 is a perspective view of the bayonet assembly of FIG. 8.

FIG. 13A is a sectional, perspective view of the receiver assembly of FIG. 8; and FIG. 13B is an enlargement of the circled portion in FIG. 13A labeled FIG. 13B.

FIGS. 15A–15C show perspective views of a bayonet assembly and receiver assembly in various stages of interconnection for selecting a 15-degree light beam spread, with outer portions of the bayonet assembly removed or broken away to show more clearly positioning pads and attached circumferential flange stops of the receiver assembly; and FIG. 15D is an enlargement of the circled portion in FIG. 15C labeled FIG. 15D.

DETAILED DESCRIPTION OF THE INVENTION

This description is divided into three parts: (1) adjustable-aim light pipe fixture, (2) designs for the foregoing, adjustable-aim lighting fixture, and (3) bayonet and receiver assemblies used in the adjustable-aim light pipe fixture.

1. Adjustable-aim Light Pipe Fixture

Figure 1A:
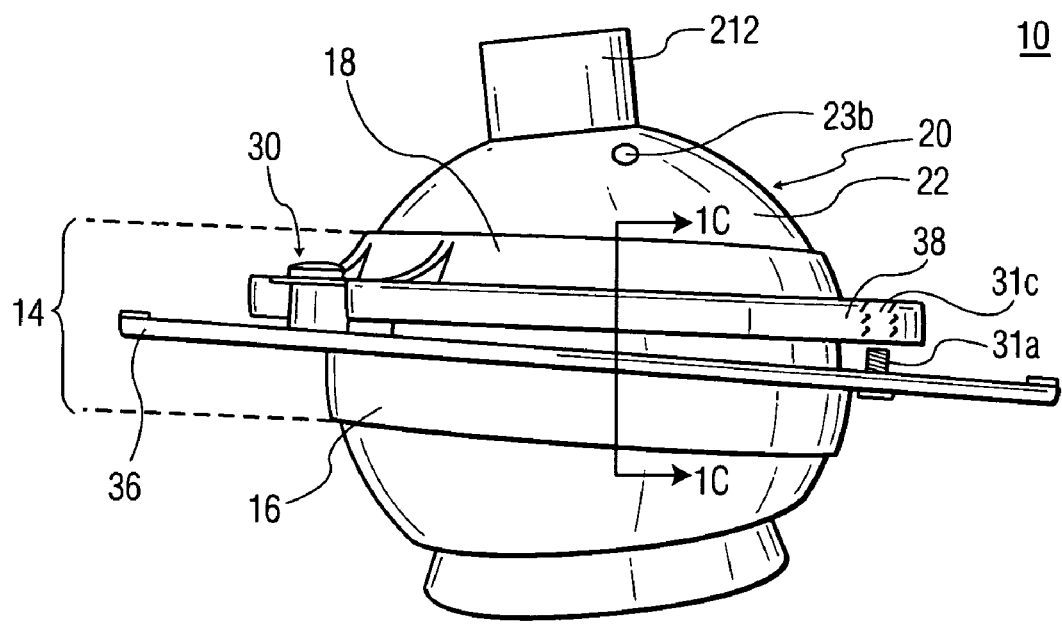
FIGS. 1A and 1B are side perspective views of an adjustable-aim light pipe fixture in different stages of adjustment in accordance with the present invention.
Figure 1B:
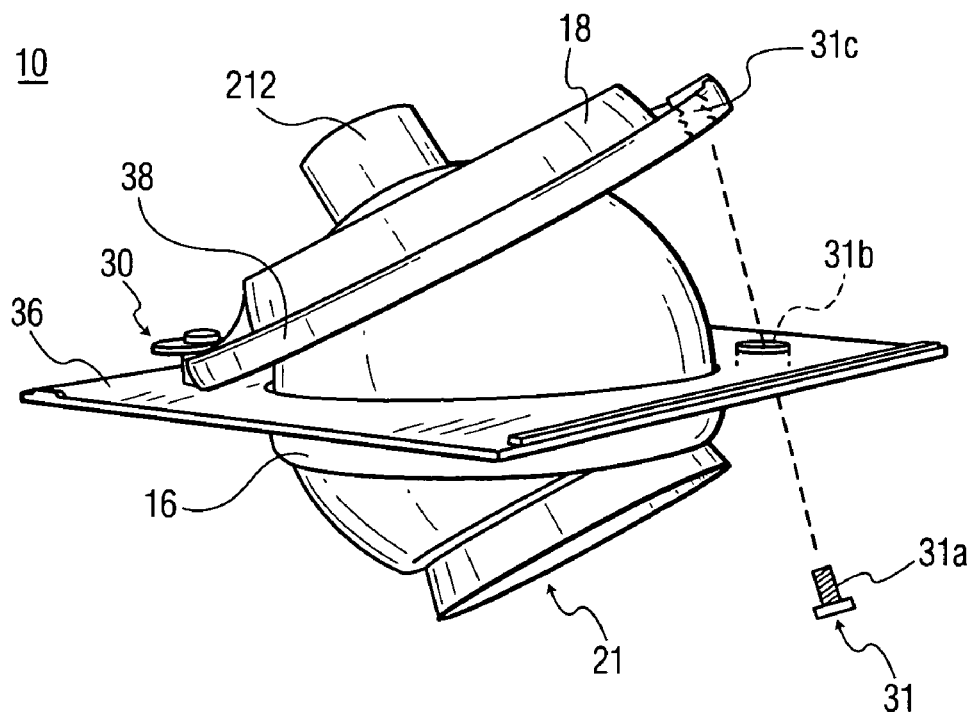

FIGS. 1A and 1B show an overview of a preferred embodiment of an inventive arrangement 10 for an adjustable lighting fixture. Arrangement 10, which is typically used with a mounting arrangement 212 for a fiber optic light pipe (omitted in this figure), preferably includes a socket 14 comprising a first retainer ring 16 and a second retainer ring 18, a spherical eyeball 20, and a clamping structure 30, 31.

Eyeball 20 is generally spherical in shape. A spherical surface 22 of eyeball 20 allows rotatable adjustment of the position of eyeball 20, as received in relation to first retainer ring 16 of socket 14.

First retainer ring 16 is preferably affixed to a socket mounting plate 36 for mounting eyeball 20. Socket mounting plate 36 preferably has a single through-hole 31b through which a screw 31a may be received. Socket plate 36 can be square, which affords a unique opportunity when used in multi-light fixtures. However, socket plate 36 may also be other shapes, such as round for use in single-spot fixtures.

Second retainer ring 18 preferably consists of a binder plate 38 to which socket plate 36 is preferably secured by clamping structure 30, in order to rotatably capture the eyeball. Binder plate 36 preferably has a single threaded-bore 31c for receiving screw 31a that passes through socket plate 36 and is threaded through binder plate 38.

Figure 1C:
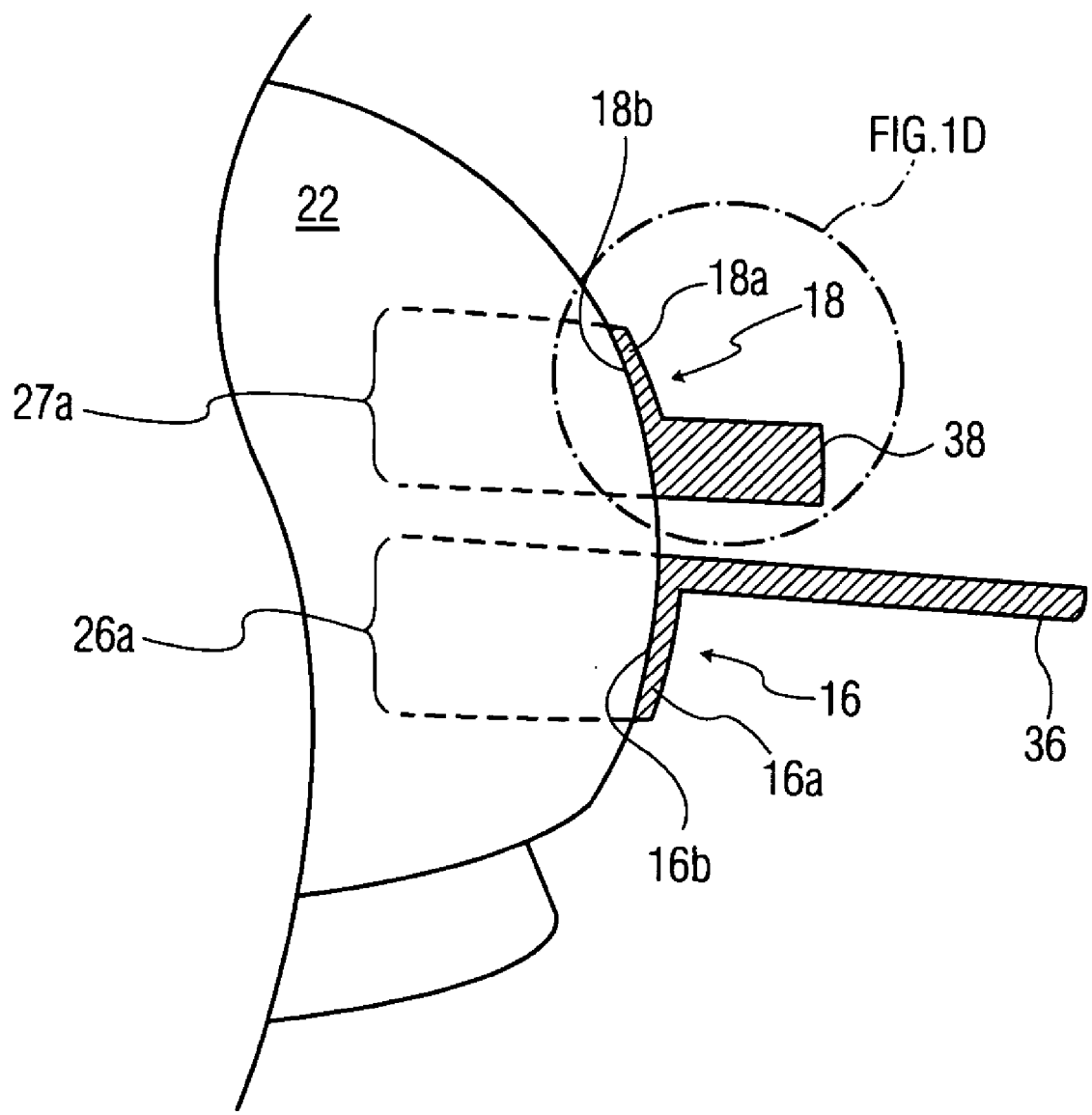
FIG. 1C is a fragmentary view, partially in cross-section, of a ring and adjacent eyeball surface taken at arrows 1C—1C in FIG. 1A.

As shown in FIG. 1C, first retainer ring 16 of socket 14 has an inner portion 16a with contact points 16b, within dimension 26a, to an outer surface 22 of eyeball 20. First retainer ring 16 is used to rotatably receive eyeball 20 while allowing for rotatable adjustment. Second retainer ring 18 has an inner portion 18a with contact points 18b, within dimension 27a, to an outer surface 22 of eyeball 20. First and second retainer rings 16 and 18 allow for rotatably receiving eyeball 20.

Figure 1D:
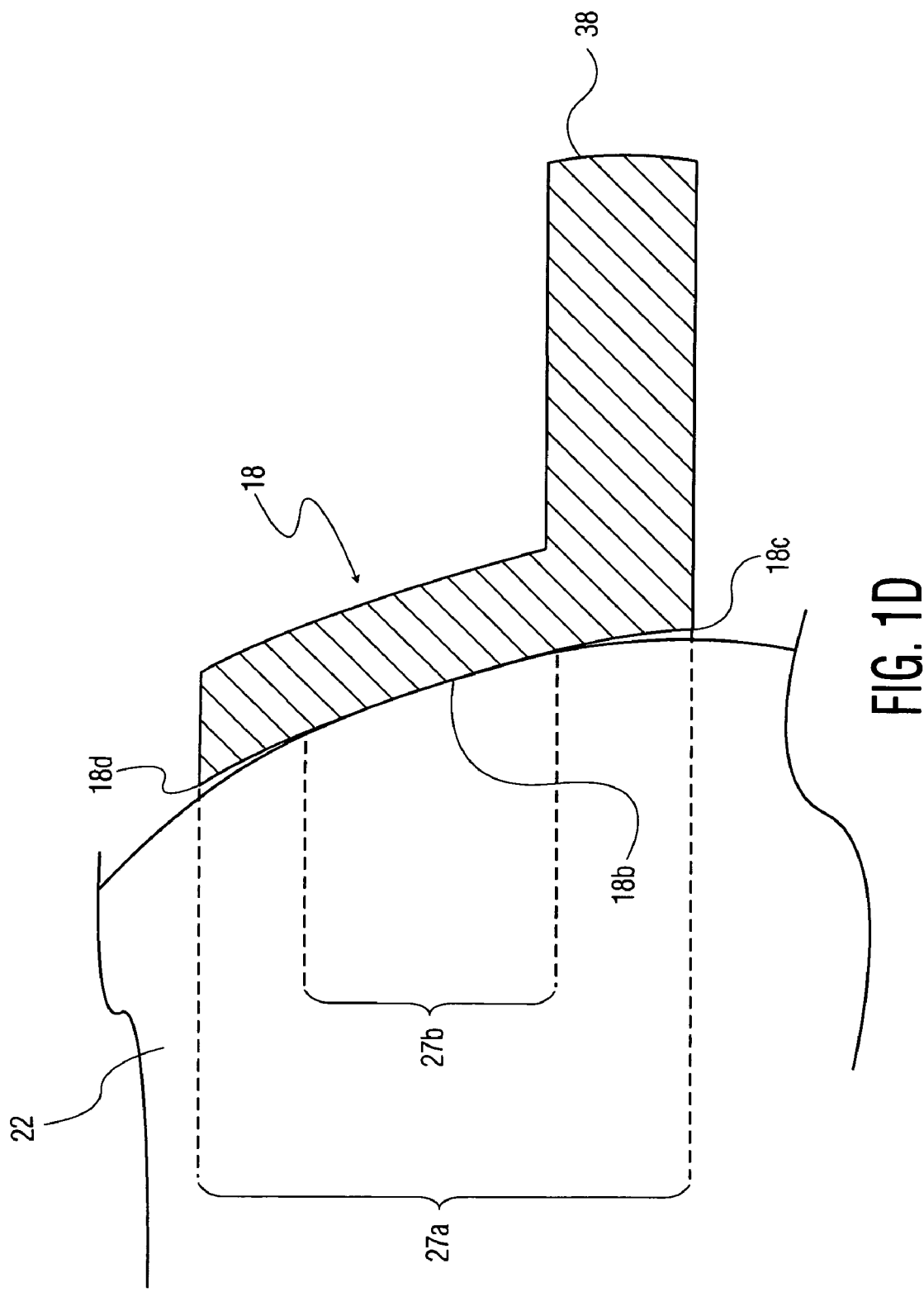
FIG. 1D is an enlarged view of the circled portion in FIG. 1C that is marked FIG. 1D.

Referring to FIG. 1C, contact points 16b preferably span less than dimension 26a, and contact points 18b span less than dimension 27a. More particularly, as shown in the enlarged view of FIG. 1D, contact points 18b preferably span only within dimension 27b. This prevents the lower 18c and upper edges 18d of retainer ring 18 from touching adjacent surfaces 22 of the eyeball, i.e., at 18c and 18d. Beneficially, this avoids damage to eyeball surface 22.

Serendipitously, if eyeball surface 22 is built up in thickness from being coated with, for instance, a powdered material, the eyeball surface becomes flatter. This increases the size of dimension 27b, in which contact points 18b between retainer ring 18 and eyeball surface 22 exist. The resulting greater surface area of contact points 18b beneficially reduces the density of compression force between the ring 18 and the eyeball surface 22. Such reduction in compression force helps avoid damage to the built up powder coating of surface 22. Conversely, where surface 22 lacks a built up dimension, for instance, by being formed of chrome plating rather than a powder coating, the resulting surface 22 becomes more concave (less flat), so that the size of dimension 27b of contact points 18b decreases. Because the chrome plating surface 22 is thinner than a powder coating, the chrome plating surface can withstand the resulting, higher compressive forces on the resulting reduced area of contact points 18b. Discussion of the inter-relation of second retainer ring 18 and surface 22 of the eyeball also apply to first retainer ring 16 and surface 22 of the eyeball.

The total angle of the cross-sectional arc spanned by retainer rings 16, 18 is greater than a minimum angle at which, when compressed, rings 16, 18 prevent physical damage to either the finish or the material of the eyeball. The total angle of the cross-sectional arc spanned by retainer rings 16, 18, measured from a center of the eyeball along a longitudinal axis 24 of the eyeball, preferably is sufficient to prevent the respective interior surfaces of each retainer ring, when compressed against the eyeball, from physically damaging either the finish or the material of the eyeball. A preferred angle in the preferred embodiment is 37 degrees (i.e., 16 degrees for ring 16 and 21 degrees for ring 18).

The greater the surface area occupied by contact points 16b and 18b (in FIG. 1C), within dimensions 26a and 27a, respectively, the less pressure is required to clamp first 16 and second ring 18 together while capturing eyeball 20. This further aids in preventing potential damage to the eyeball.

Figure 2A:
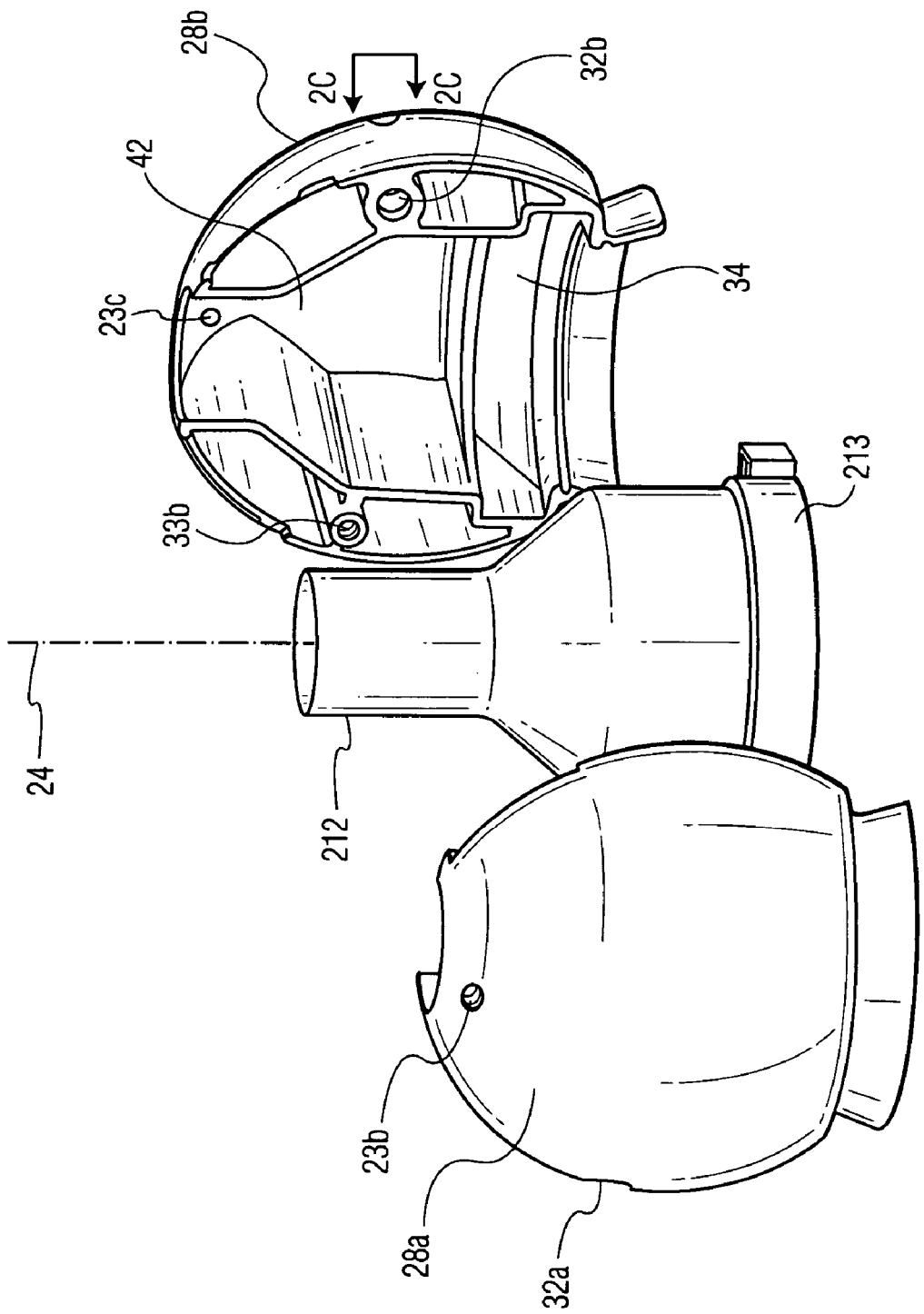
FIG. 2A is an exploded perspective view of two halves of an eyeball of FIGS. 1A and 1B, between which a mounting arrangement for fiber optic light pipe is shown.
Figure 2B:
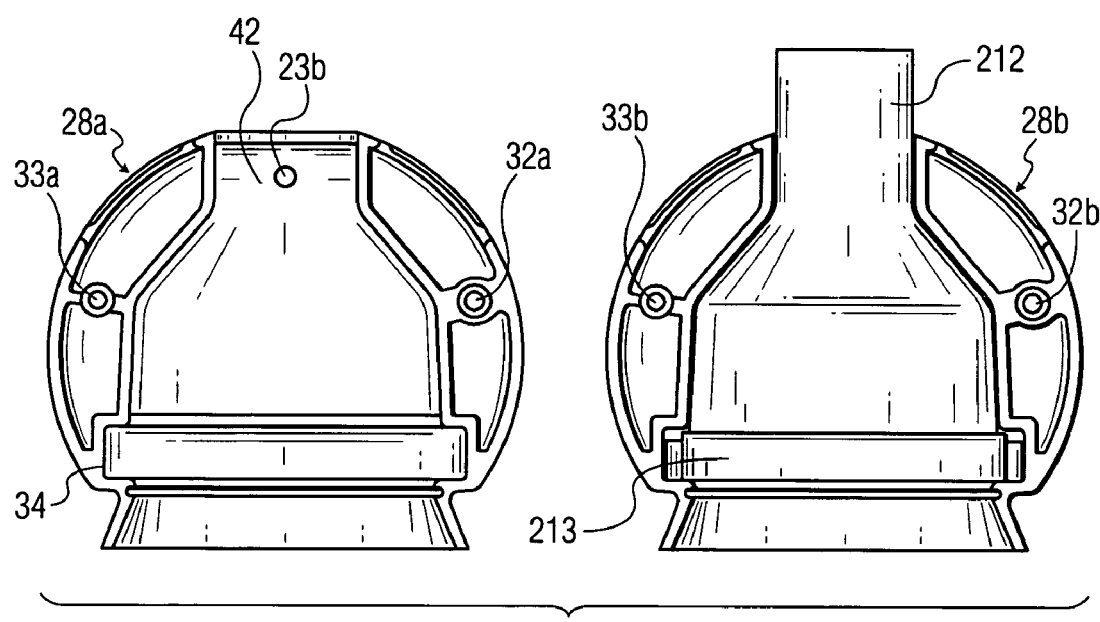
FIG. 2B shows the interior of a first half of an eyeball of FIGS. 1A and 1B, and a second half of such eyeball receiving a mounting arrangement for fiber optic light pipe.
Figure 2C:
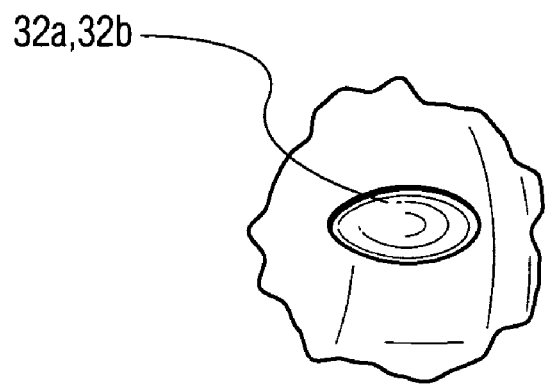
FIG. 2C is an enlarged, fragmentary view of a through-hole extending to the outer surface of the eyeball of FIG. 2A, taken at arrows 2C—2C in FIG. 2A.

As shown in FIGS. 2A and 2B, eyeball 20 is preferably formed from a pair of identical, molded parts 28a, 28b. Each molded part 28a, 28b has a single through-hole 32a, 32b (respectively) and a corresponding threaded-bore 33a, 33b (respectively) for a screw (not shown) to secure the two halves 28a, 28b of eyeball 20. FIG. 2C shows through-hole 32a, 32b, extending to the outer surface of the eyeball. Alternatively, eyeball 20 may be formed from non-identical molded parts (not shown).

Eyeball 20 includes mounting arrangement 212 for a light pipe (FIGS. 2A–2B). An interior 42 of eyeball 20 is shaped in such a way that when two halves 28a, 28b of eyeball 20 are brought together, mounting arrangement 212 is free to rotate within the assembled eyeball 20. Mounting arrangement 212 preferably includes a flange 213 extending outwardly with respect to the longitudinal axis of the end of a light pipe 24. The pair of molded parts 28a, 28b preferably includes an annular groove 34 with an inner opening for receiving flange 213, for holding mounting arrangement 212 in eyeball 20. As an alternative to eyeball 20 enveloping mounting arrangement 212, the eyeball can directly envelop a light pipe or indirectly with other types of mounting structures.

Figure 2D:
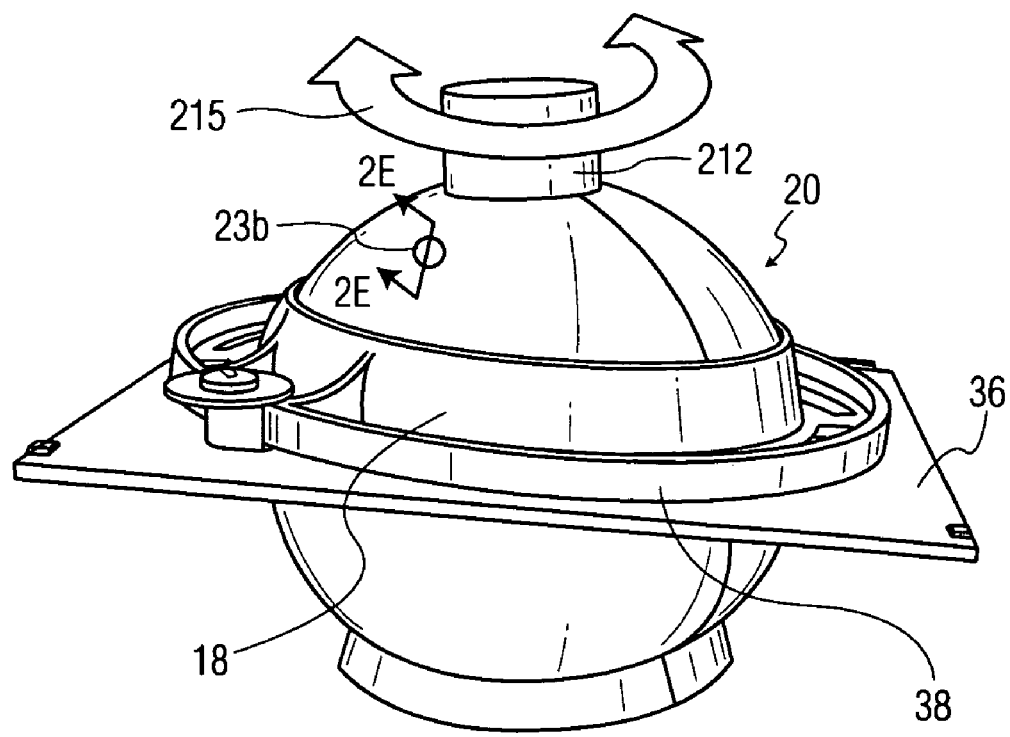
FIG. 2D is an upper perspective view of FIGS. 1A and 1B.

As shown in FIG. 2D, when mounting arrangement 212 is enveloped in eyeball 20 and eyeball 20 is firmly captured between socket plate 36 and binder plate 38, mounting arrangement 212 is still free to rotate within eyeball 20. This free rotation of mounting arrangement 212, as indicated by a double-headed arrow 215, allows the fiber optic (not shown) to relieve any torque that may build up within the fiber as eyeball 20 is adjusted after installation. Optimally, eyeball 20 captures mounting arrangement 212 without changing the light-beam output distribution from fiber optic.

Figure 2E:
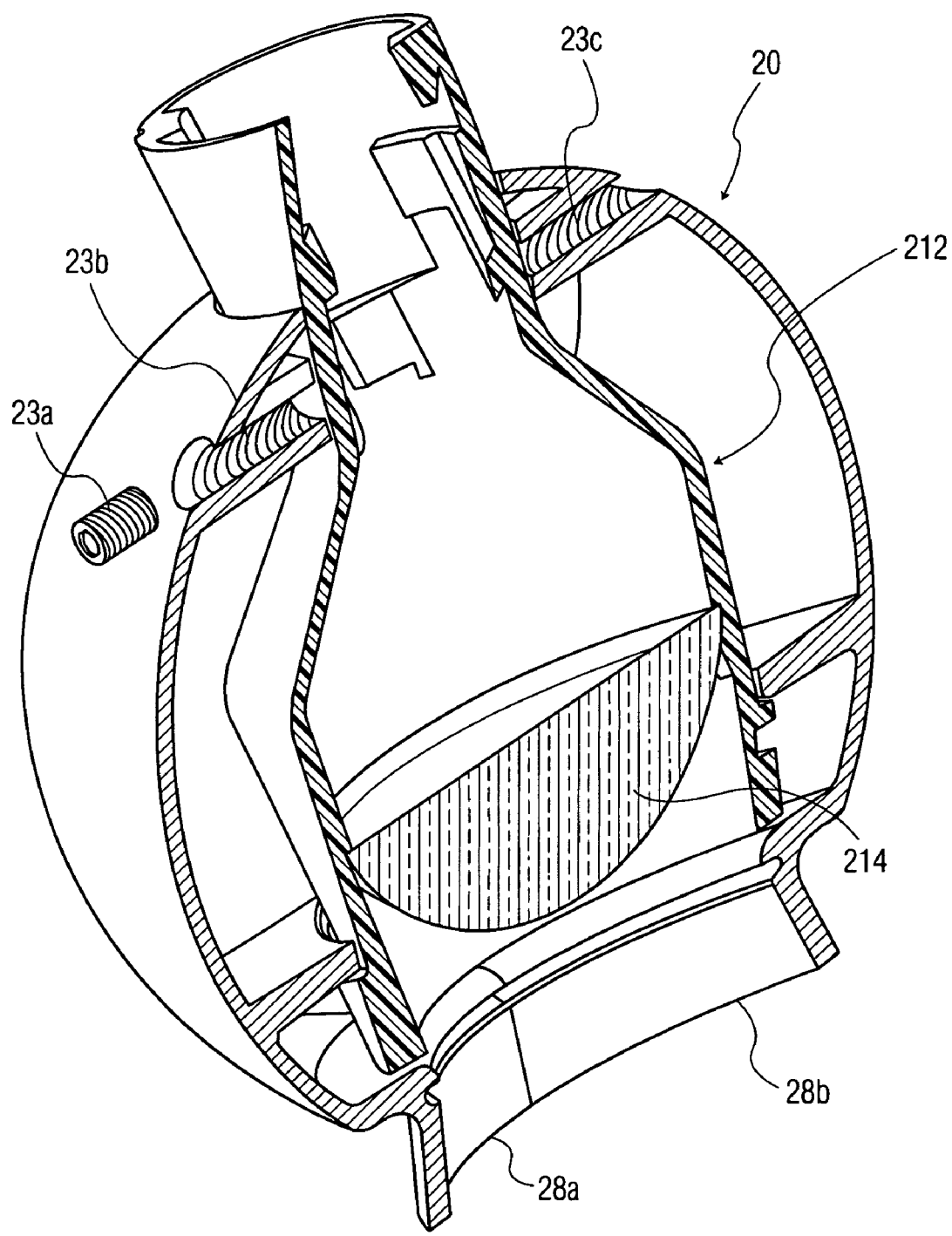
FIG. 2E is an upper perspective view in cross-section of an eyeball enveloping a mounting arrangement of FIG. 1A, taken at arrows 2E—2E in FIG. 2D.

However, when rotatably inserting a coupling member into mounting arrangement 212, it is often desirable to prevent free rotation of mounting arrangement 212 within the eyeball. For instance, coupling member 210, referred to as a bayonet assembly 210 in connection with FIG. 8 below, may be rotatably inserted into mounting arrangement 212, referred to as a receiver assembly 212 in connection with FIG. 8 below). To prevent mounting arrangement 212 from rotating, FIG. 2E shows a set screw 23a threadedly received within threaded-bore 23b in eyeball part 28a. When set screw 23a is torqued against an upper wall of mounting arrangement 212 (which includes a lens 214), the mounting arrangement is held in fixed relation to eyeball 20, so that a coupling member (not shown) can be rotatably inserted into the mounting arrangement more easily. After the coupling member (i.e., bayonet assembly 210 of FIG. 8 below) has been rotatably locked into place, set screw 23a can be unscrewed, thereby freeing mounting arrangement 212 to rotate and thus provide torque relief to the coupling member (i.e., bayonet assembly 210 of FIG. 8 below) and associated fiber optic cable. If desired, a second set screw (not shown) can be inserted into threaded-bore 23c in eyeball part 28b.

Figure 3:
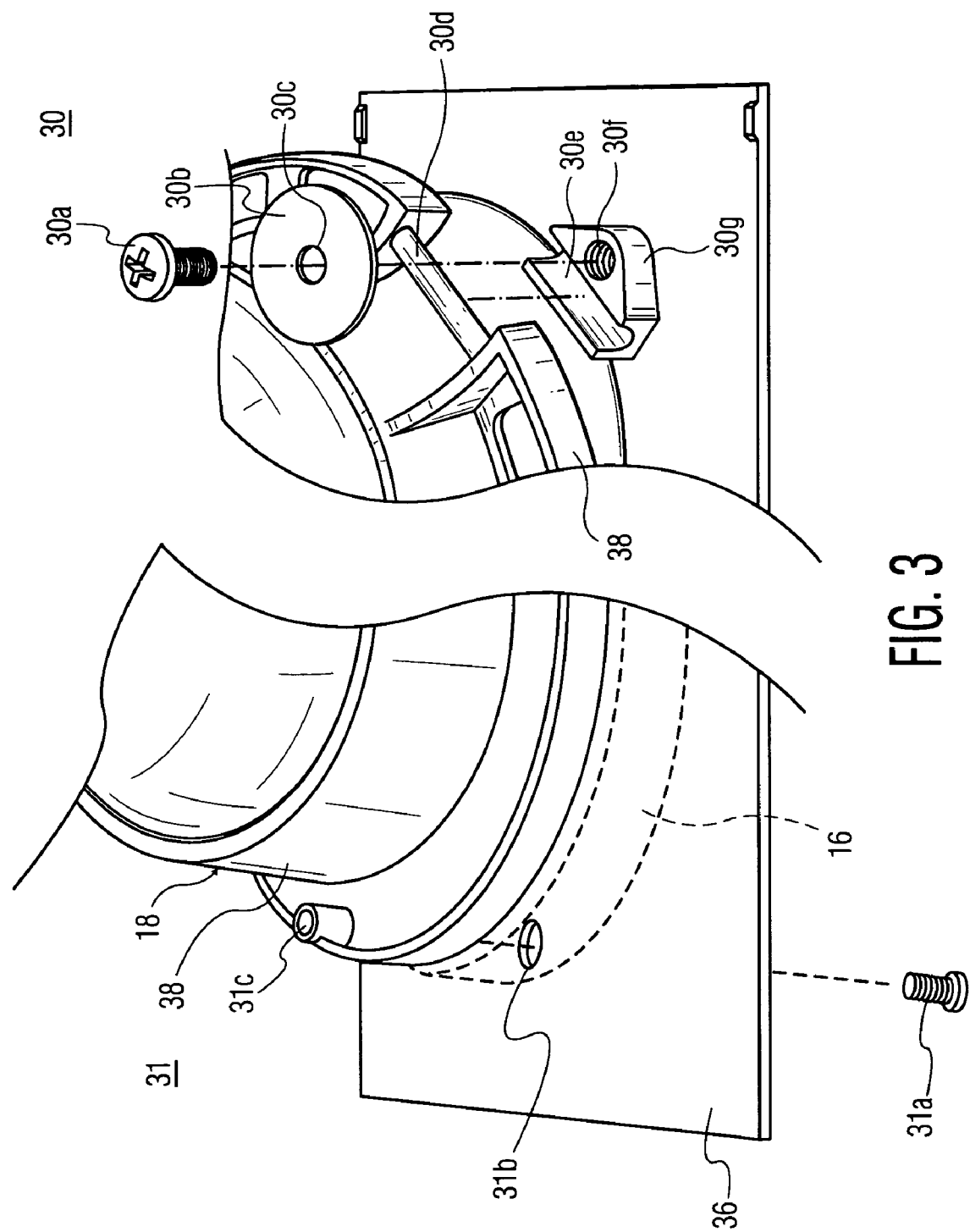
FIG. 3 is an exploded, fragmentary, upper perspective view of the hinge and adjustment means of FIG. 1B.

As illustrated in FIGS. 1B and 3, clamping structure 30, 31 clamps first 16 and second 18 retention rings against each other in such a manner as to capture eyeball 20 in fixed relation to first retainer ring 16. Clamping structure 30 of a preferred embodiment of the present invention preferably comprises (1) a hinge 30 between adjacent portions of first 16 and second 18 retainer rings and (2) an adjustment means 31 that is preferably accessible from below the light fixture, that is, a side of plates 36, 38, distant from an equator of eyeball 20 that is approximately coincident with rings 16, 18.

Hinge 30 preferably comprises a screw 30a that is received in a through-hole 30c of a washer 30b. A longitudinal hinge member 30d is mounted on binder plate 38. Longitudinal hinge member 31d is received within a slot 30e in protrusion 30g, which is mounted on socket plate 36. Protrusion 30g has a threaded-bore 30f through which screw 30a is received.

Cooperating adjustment means 31 preferably comprises a threaded lock down structure, such as through the use of a screw 31*a*. Screw 31*a* is preferably received within a single through-hole 31*b* in socket plate 36. Screw 31*a* passes through to binder plate 38, in which screw 31*a* is finally received in a threaded-bore 31*c* in binder plate 38. When adjustment means 31 begin to engage socket plate 36 and binder plate 38, eyeball 20 is lightly captured between plates 36, 38. Eyeball 20 is then free to rotate in this lightly-captured position. However, as screw 31*a* is rotated so as to be further received within threaded-bore 31*c* on binder plate 38, a compression force is exerted against eyeball 20 as it rests against socket plate 36 and binder plate 38.

Meanwhile, hinge 30 advantageously pivots first 16 and second 18 retainer rings to capture eyeball 20. By hinging one side of binder plate 38, another side of binder plate 38 is capable of freely moving up and down, relatively to fixed socket plate 36, to unlock and lock light pipe fixture of arrangement 10. Hinged socket plate 36 essentially provides a leveraging function which readily generates a considerable force for capturing the eyeball in a fixed position. By using a threaded lock down method, adjustment means 31 increases the mechanical advantage to the user as the adjustment means 31 is engaged to bring binder plate 38 into a clamping position. Sufficient forces result to capture eyeball 20 into place within socket plate 36 and binder plate 38. However, this increase in force to capture eyeball 20 within the two plates 36, 38 is not a highly localized force on the eyeball. Rather, the force is spread out over the considerable area of rings 16, 18. This avoids damage or deformation of the finish and/or material of eyeball 20.

Once binder plate 38 is fully engaged with socket plate 36 via hinge 30 and adjustment means 31, eyeball 20 is secured in a fixed position with respect to socket plate 36. It can be appreciated from FIG. 1B, for instance, that only screw 31*a* of clamping structure 30, 31 is visible from the face of the fixture of arrangement 10. As such, a user needs to merely loosen that single screw 31*a*, grasp and aim an output area 21 of the eyeball, and tighten screw 31*a* to re-aim the lighting fixture. Thus, the clamping means 30, 31 allows for easy aiming of the light fixture while maintaining an aesthetically pleasing appearance of the fixture.

The preferred adjustable-aim fiber optic eyeball arrangement 10 can be used as a single fixture much in the same way as a down light or wall wash fixtures. The preferred adjustable-aim fiber optic eyeball arrangement 10 can have the position of eyeball 20 oriented, within the fixture, from an exterior of the fixture (i.e., from the bottom side of socket plate 36) via adjustment means 31.

2. Lighting Fixture Designs

As apparently shown in FIG. 1A, socket plate 36 and eyeball 20 can be left exposed from an underside of the fixture and serve as the finished fixture, as in arrangement 10. In alternative embodiments of the present invention, the adjustable-aim fiber optic eyeball arrangement 10 can be mounted in a variety of ways.

Figure 4A:
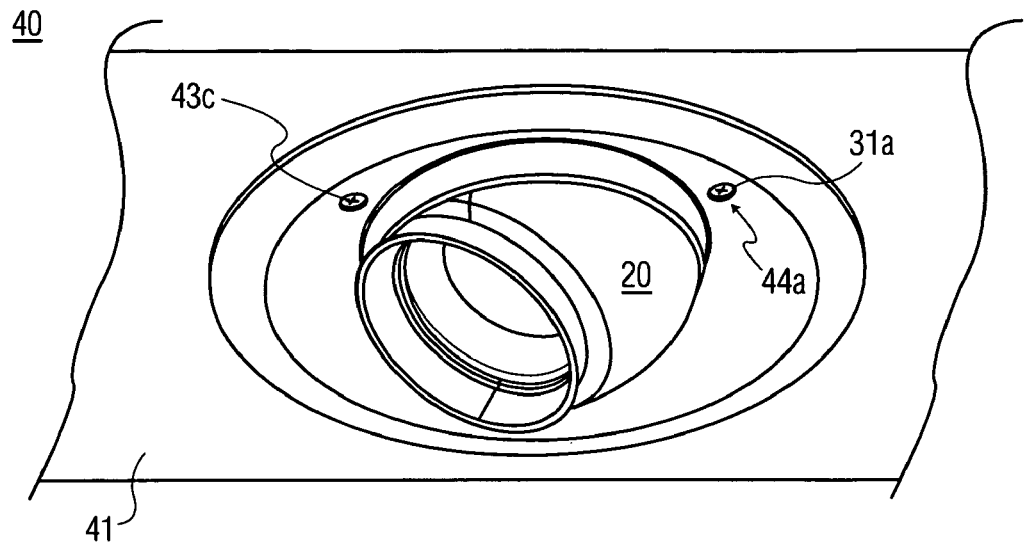
FIG. 4A is a lower perspective view of the adjustable-aim light pipe fixture of FIGS. 1A and 1B mounted in a drop ceiling.

FIG. 4A shows one preferred embodiment of the adjustable-aim fiber optic eyeball arrangement 10 being mounted in a drop ceiling 41 to create a single-point adjustable down light arrangement 40. Beneficially, arrangement 40 may include eyeball 20, first retainer ring 16, adjustment screw 31*a*, and the remainder of eyeball arrangement 10 of FIG. 1A. A beauty trim 44 gives the lighting fixture an aesthetic appearance when mounted in drop ceiling 41. A through-hole 44*a* in beauty trim 44 permits manipulation of adjustment screw 31*a* (FIG. 1A) from below the fixture, for capturing the eyeball 20 in a desired orientation.

Figure 4B:
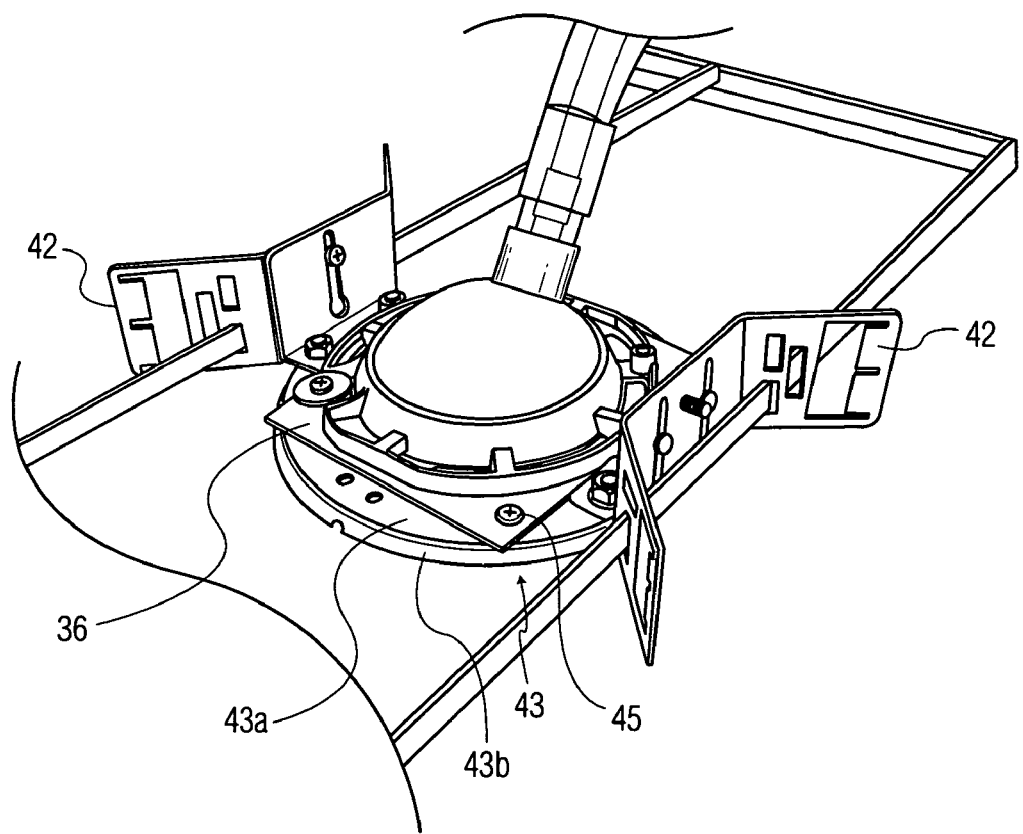
FIG. 4B is an upper perspective view of the foregoing light pipe fixture mounted in a drop ceiling.

FIG. 4B shows a mounting structure of a preferred down light arrangement 40. Arrangement 40 is preferably mounted using conventional butterfly brackets 42. Butterfly brackets 42 are preferably mounted onto an intermediate mounting member 43, which has an upper circular plate portion 43*a* and a downwardly depending, annular portion 43*b*. Preferably, a pair of screws 43*c* (only one shown in FIG. 4A) for mounting beauty trim 44, passes upwardly through beauty trim 44, through intermediate plate portion 43*a* and into a threaded-bore (not shown) in square-shaped socket plate 36. Socket plate 36 may alternatively be circularly shaped, for instance. Preferably, a pair of screws 45 (only one shown in FIG. 4B) passes downwardly through socket plate 36 for mounting the socket plate onto intermediate mounting member 43. Screws 45 may be received in threaded bores (not shown) in circular plate portion 43*a*. Rather than using butterfly brackets 42, arrangement 40 can be mounted using sled and caddy rails (not shown) or other standard mounting means for mounting into a drop-in or hard ceiling.

In addition to mounting the adjustable-aim lighting fixture 10 alone as shown in FIGS. 4A and 4B, for instance, the fixture may be beneficially incorporated, as a modular unit, into linear, multi-point light arrangements. These linear, multi-point light arrangements can be either surface-mounted or suspended-track arrangements. Square-shaped socket plates 36 especially lend themselves to linear light arrangements.

Figure 5A:
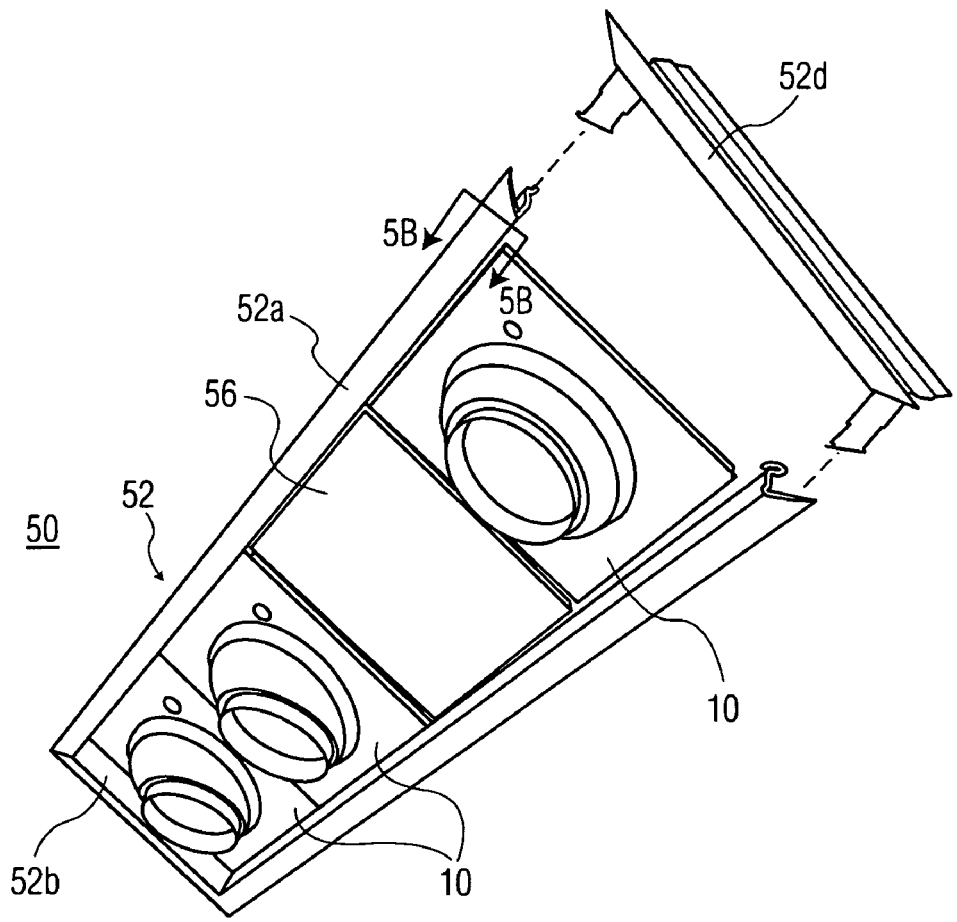
FIG. 5A is a lower perspective view of a linear, multi-point light arrangement in partially assembled form.

FIG. 5A shows an exemplary form of a linear, multi-point light arrangement 50 incorporating multiple adjustable-aim light fixtures 10 as described above in connection with FIGS. 1A through 3. Each light fixture 10 comprises a modular unit, three of which are shown within an integrally formed, generally U-shaped portion of frame 52, comprising frame sides 52*a*, 52*b*, 52*c*. Alternatively, frame sides 52*a*, 52*b*, 52*c* can be separate parts, mechanically joined together. Interposed between a pair of fixtures 10 is a spacer plate 56. Such spacer plate 56 may be optionally included to prevent all of the light sources from being bunched in the same spot or to contribute to a uniquely-shaped track lighting fixture. End frame side 52*d* has not been yet joined to frame sides 52*a* and 52*c*, which are spread apart from each other more than in their assembled state.

Figure 5B:
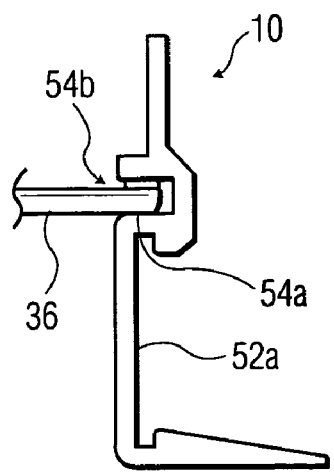
FIG. 5B is a detailed view of a frame side receiving a socket plate of a light fixture, taken at arrows 5B—5B in FIG. 5A.

FIG. 5B shows how light fixtures 10 or spacer plate 56 can be mounted into frame sides, such as 52*a*. As shown in FIG. 5B, an edge of socket plate 36 of fixture 10 rests on a respective ledge 54*a* or preferably is received within a groove 54*b* of frame side 52*a*. Ledge 54*a* or groove 54*b* runs the length of frame 52 for accepting a respective edge of a socket plate 36 or of a spacer plate 56. A light fixture or spacer plate need only be sandwiched between a pair of opposing frame sides (e.g., 52*a*, 52*c*) to be mounted in frame 52.

In assembling linear light arrangement 50 (FIG. 5A), multiple eyeball fixture arrangements 10 or spacer plates 56 can be slid into respective ledges (e.g., 54*a*, FIG. 5B) or grooves (e.g., 54*b*, FIG. 5B) along frame 52. Once the fixtures 10 and optional spacer plates 56 are pressed adjacent to each other, frame member 52*d* can be joined to frame members 52*a* and 52*c*, to complete assembly of linear light arrangement 50.

Frame 52 can be of any shape, depending on the number of eyeball assemblies 10 and on the shape of the socket plates 36 or spacer plates 56. For instance, while socket and spacer plates are shown as square, they may be configured in other shapes resulting in a non-linear (e.g., arc-shaped), multi-point arrangement, including rounded end frame sides which would provide an additional unique appearance.

Figure 6:
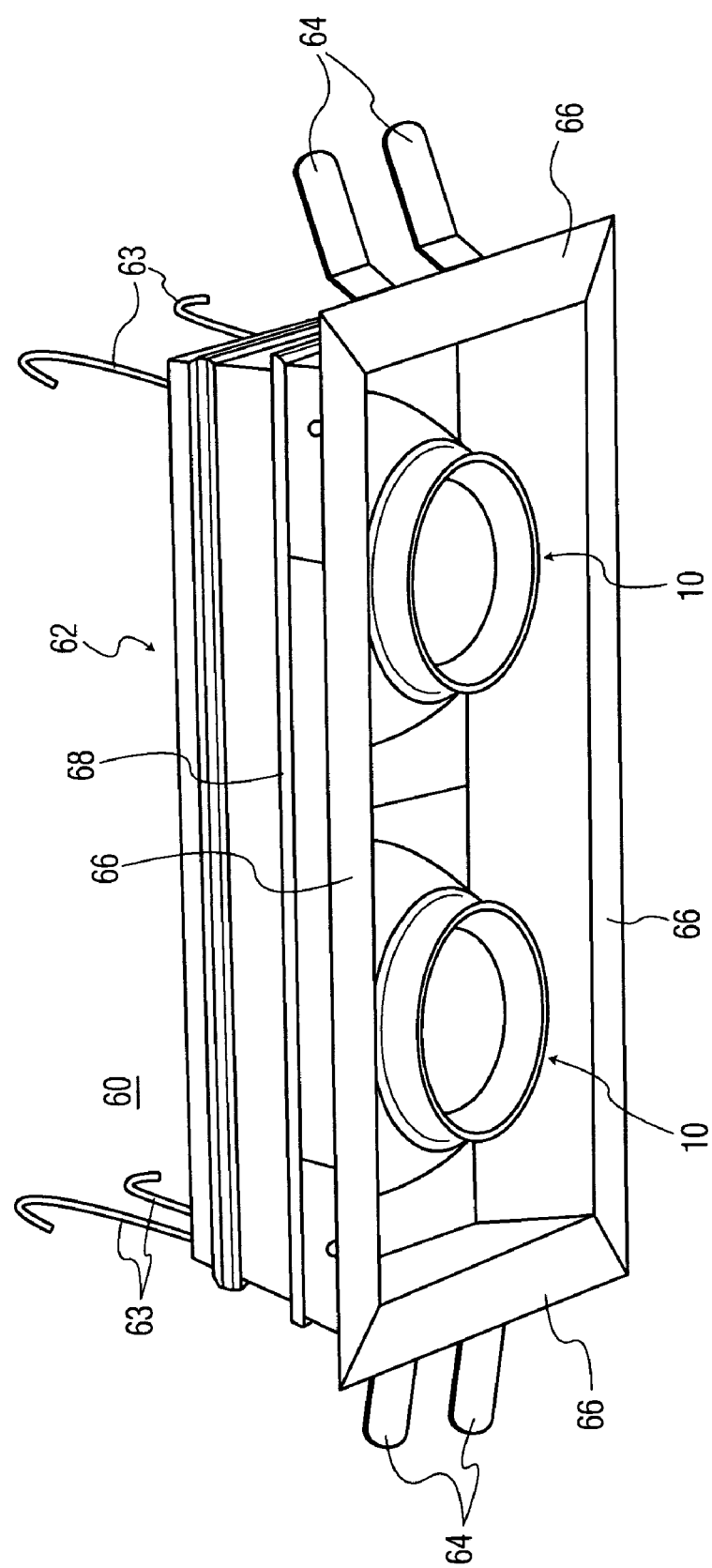
FIG. 6 is a lower perspective view of a linear, multi-point light arrangement suitable for installation in dropped or hard ceilings.

FIG. 6 shows a linear, multi-point light arrangement 60, including a pair of adjustable-aim light fixtures 10, as described above. An upper portion of frame 62 is configured for reception into standard mounting apparatus (not shown) for a drop ceiling, using wire springs 63. Alternatively, two pairs of flat springs 64 may be received between trim pieces 66 and a ledge 68 that surrounds frame 62. Flat springs 64 are conventionally used for mounting a light fixture into a hard ceiling (e.g., sheetrock). Light fixtures 10 are aesthetically recessed above trim pieces 66. The height of the preferred adjustable-aim fiber optic eyeball arrangement 10 can be accommodated with minimal clearance.

Incidentally, flat springs 64, such as shown with the multi-point light arrangement of FIG. 6, may also be used with single-point light arrangements, such as arrangement 40 of FIGS. 4A and 4B. The ability to use flat springs 64 with a single point 40 or multi-point 60 light arrangements is especially useful in retrofit situations for hard ceilings where access to the above-ceiling structure is usually extremely limited.

Figure 7A:
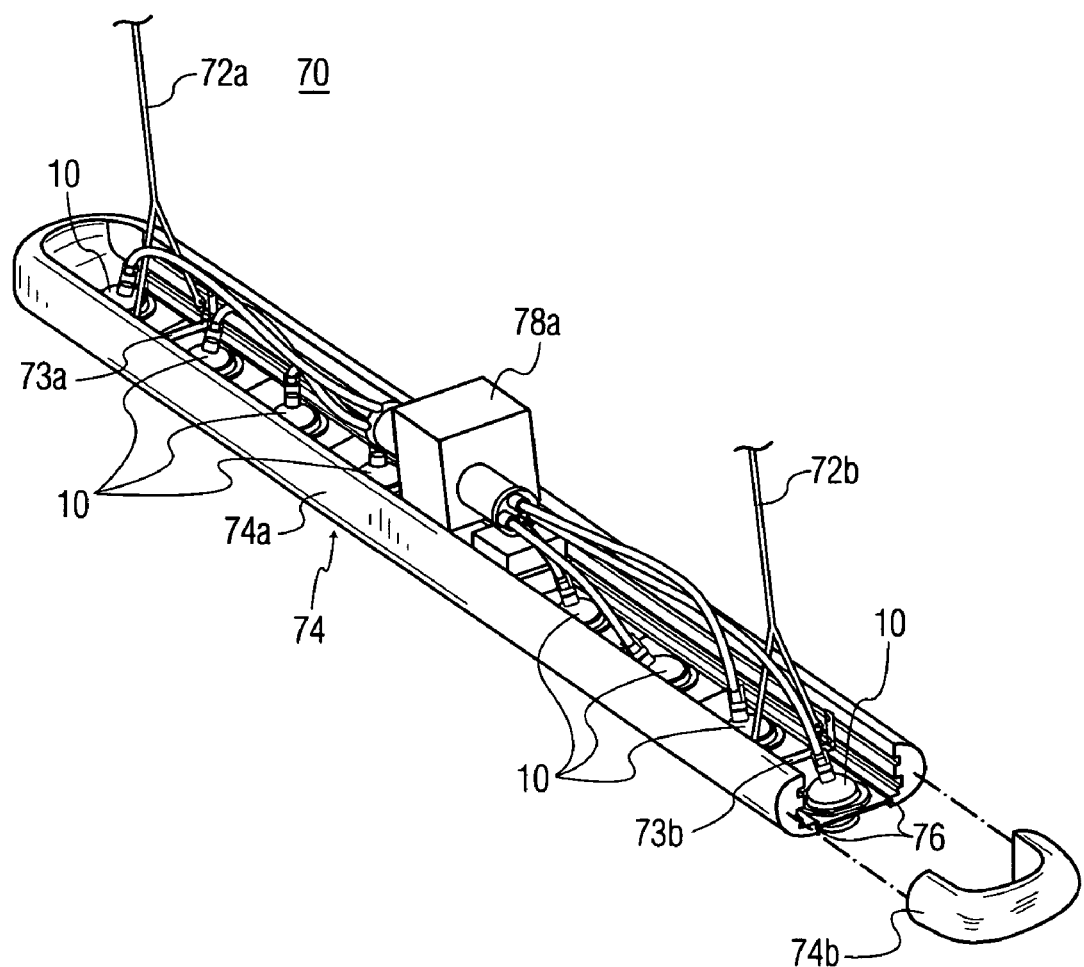
FIG. 7A is an upper perspective view, partially in cross-section of a linear, multi-point light arrangement in a suspended, track form.

FIG. 7A shows a linear, multi-point light arrangement 70 in suspended, track form. Guide wires 72*a*, 72*b* mounted on brackets 73*a*, 73*b*, respectively, suspend frame 74 of arrangement 70 below a ceiling. As shown, arrangement 70 includes eight adjustable-aim light fixtures 10 mounted within respective grooves 76 in frame member 74*a*, in the same manner as an edge of plate 36 in FIG. 5B is received within groove 54*b* of frame side 52*a*. A right-hand end member 74*b* of frame 74 may be coupled to the frame member 74*a* in a removable manner so as to allow insertion of light fixtures 10 into grooves 76. Instead of end member 74*b*, arrangement 70 could be made longer (or indefinitely longer) by adding one or more additional frame members, similar to illustrated member 74*a*. Additional light fixtures 10 and illuminator(s) with spacer(s), associated with the additional frame member(s), would complete the arrangement.

Beneficially, arrangement 70 includes an illuminator 78*a* (as defined above) and a ballast 78*b* for the illuminator. Electrical wires (not shown) would typically be wound in an aesthetically concealed manner around a guide wire 72*a* or 72*b*. Spacers 56, shown in FIG. 7B aesthetically conceal illuminator 78*a* and ballast 78*b* from linear light arrangement 70.

Figure 7B:
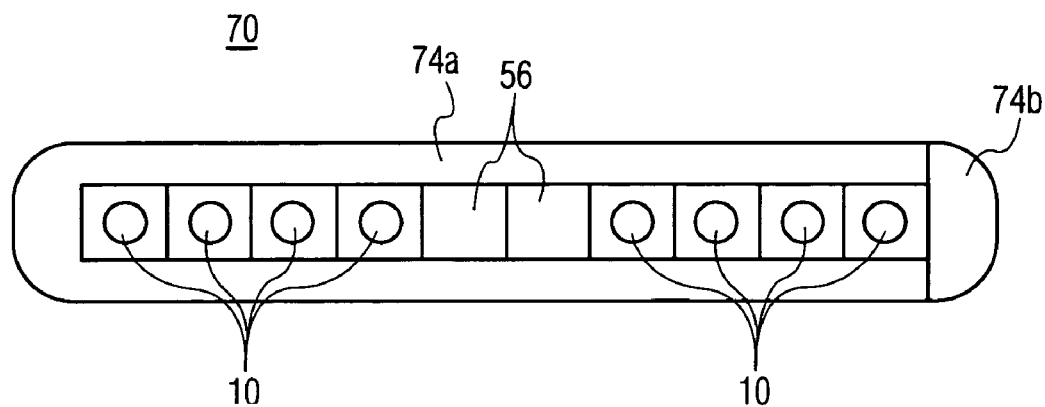
FIG. 7B is a bottom view of the light arrangement of FIG. 7A.

Because linear light arrangement 70 of FIGS. 7A and 7B includes an on-board illuminator 78*a* and ballast 78*b*, it advantageously constitutes a stand-alone unit that may be placed in any location. Such a stand-alone unit is unique to a fiber optic system, especially one using monofilament fibers.

3. Bayonet and Receiver Assemblies

Figure 8:
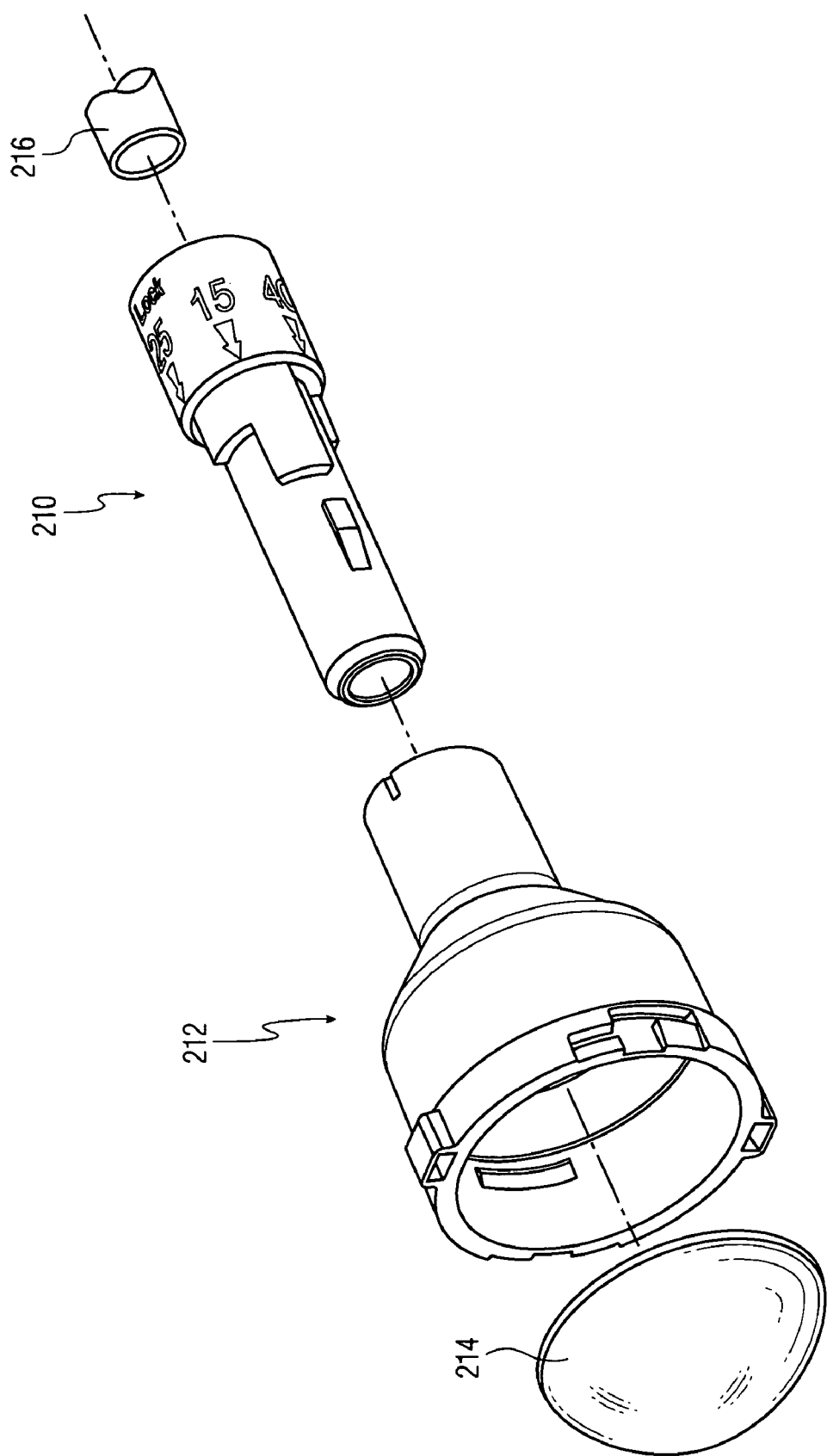
FIG. 8 is a perspective, exploded view of a bayonet assembly, light pipe, receiver assembly and lens in accordance with the invention.

FIG. 8 shows a bayonet assembly 210 and cooperating receiver assembly 212, which holds a lens 214. These three components are essential parts of the light pipe fixture of the invention. By way of example, lens 214 may be a plano-convex lens, an aspherical lens, a holographic lens, a Fresnel lens or a flat lens, made from either glass or plastic.

Figure 9A:
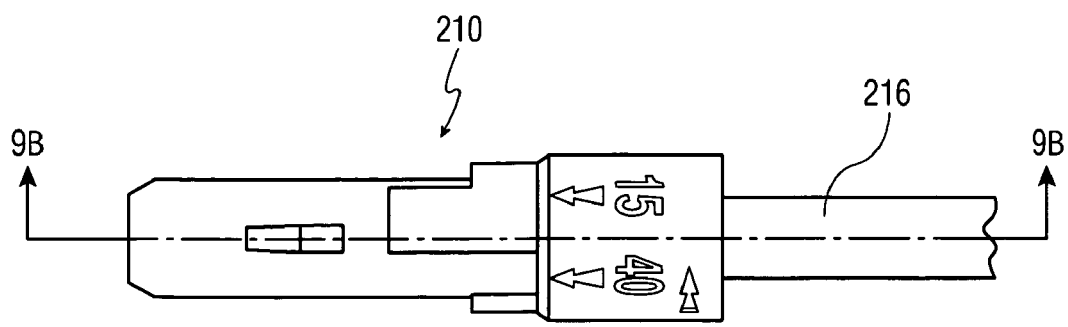
FIG. 9A is a side view of the bayonet assembly and light pipe of FIG. 8.
Figure 9B:
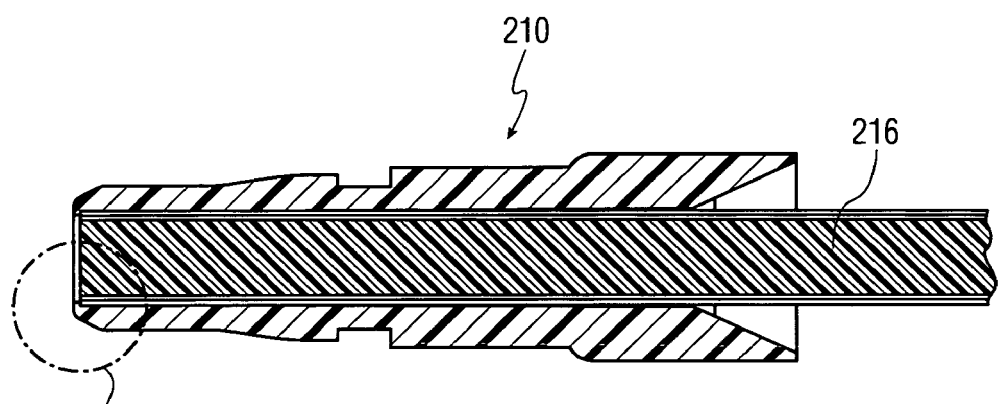
FIG. 9B is a sectional view of FIG. 9A taken at Arrows 2B—2B in FIG. 9A.
Figure 9C:
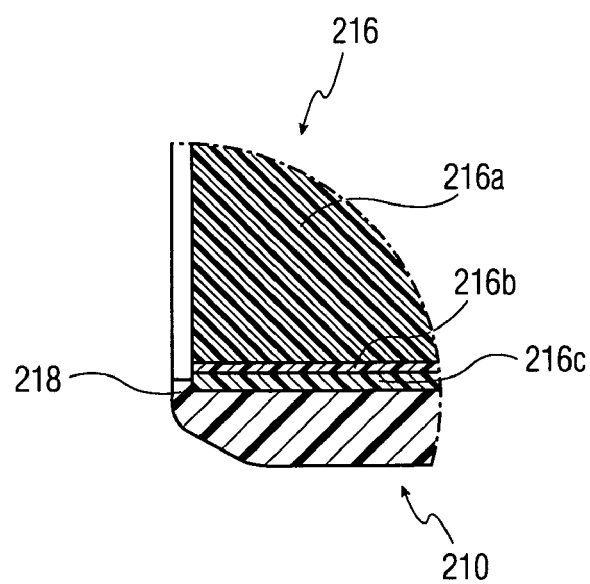
FIG. 9C is an enlargement of the circled portion of FIG. 9B labeled FIG. 9C.

Light pipe 216 is received into bayonet assembly 210 and secured in such assembly by an adhesive. As shown in connection with FIGS. 9A–9C, bayonet assembly 210 uses an internal lip 218 (FIG. 9C) to stop the inserted light pipe at a precise location.

Figure 10A:
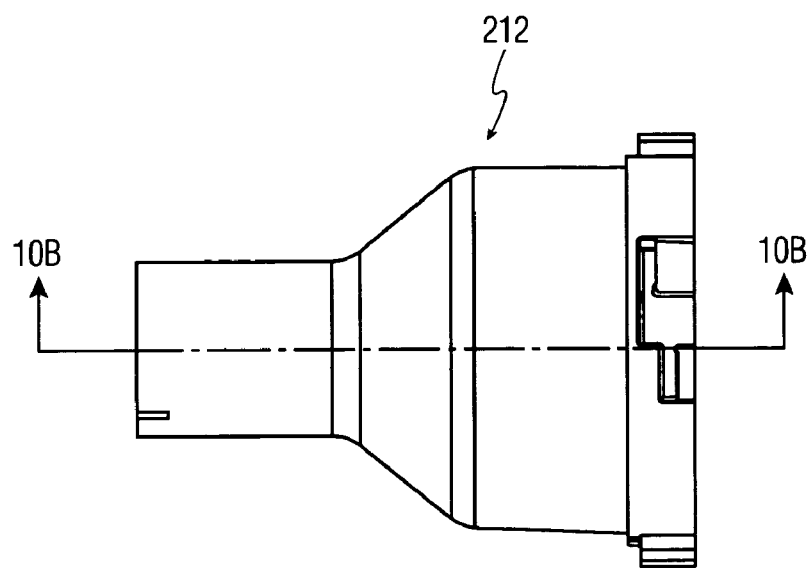
FIG. 10A is a side view of the receiver assembly of FIG. 8.
Figure 10B:
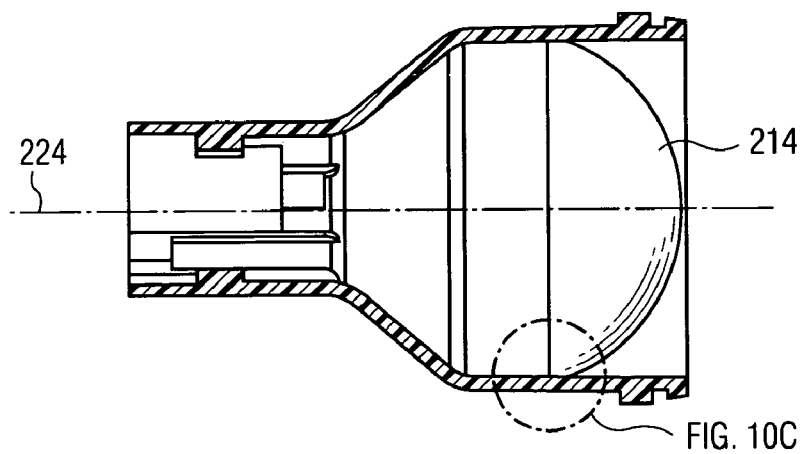
FIG. 10B is a sectional view of FIG. 10A taken at Arrows 3B—3B in FIG. 10A.
Figure 10C:
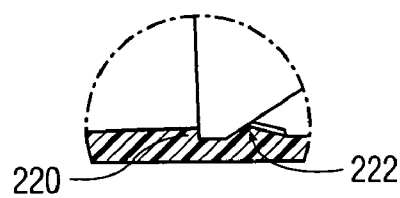
FIG. 10C is an enlargement of the circled portion of FIG. 10B labeled FIG. 10C.

As shown in connection with FIGS. 10A–10B, receiver assembly 212 utilizes an internal shelf 220 (FIG. 10C) and radial snaps 222 (FIG. 10C) to lock the lens into a precise location. With receiver assembly 212 being molded from Acrylonitrile Butadiene Styrene (ABS), for instance, radial snaps 222, preferably two in number, preferably occupy between about 5 and 20 degrees of circumference about a longitudinal axis 24 of such assembly, and more preferably between about 5 and 15 degrees. Preferably, the ABS for the receiver assembly is "platable" in that it can accept such coatings as chrome or brass, for reflective purposes.

Figure 11C:
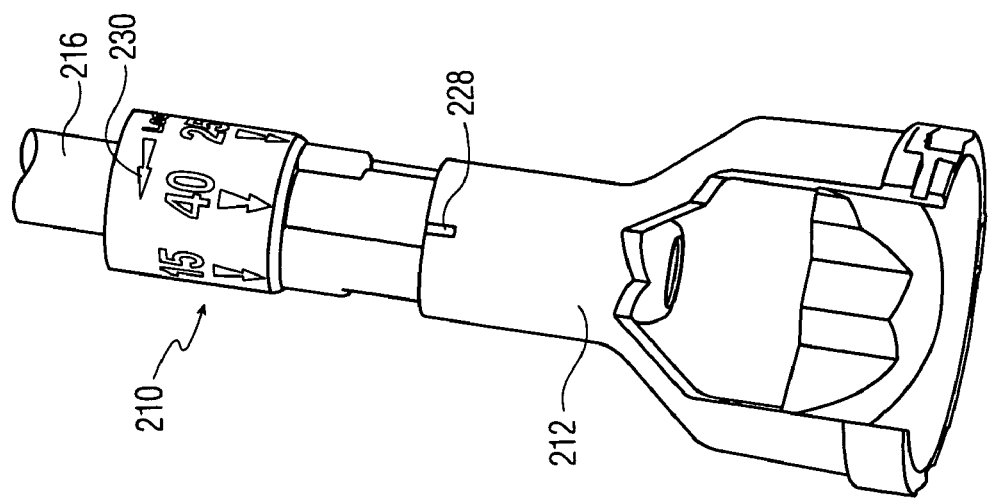
FIGS. 11A–11C are perspective views, partially cutaway, of initial relative positions of the bayonet and receiver assemblies of FIG. 8 for attaining different light beam spreads.
Figure 11B:
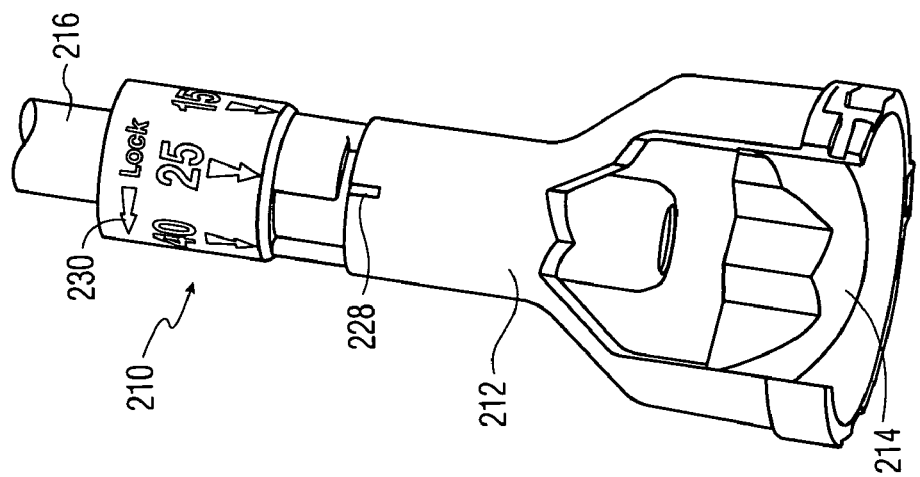
Figure 11A:
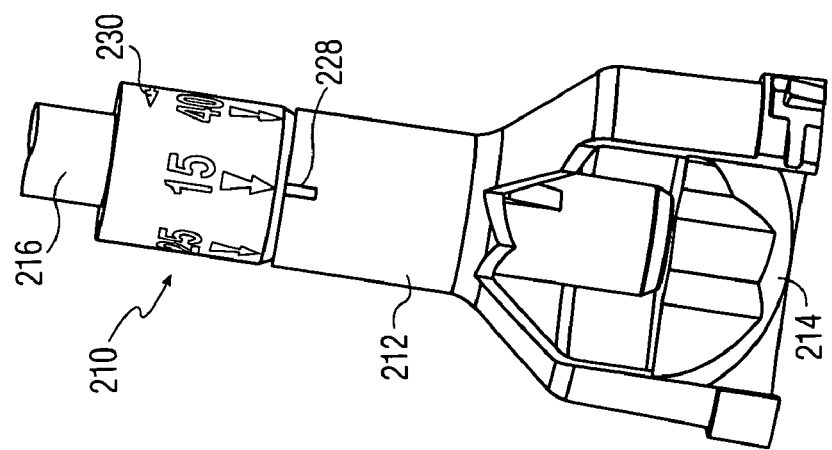

FIGS. 11A–11C show respective, initial relative positions of bayonet assembly 210 and receiver assembly 212 for achieving light beam spreads exiting lens 214 of degrees of 15, 25 and 40, respectively, by way of example. In the positions shown, a notch 228 or other mark on receiver assembly 212 is aligned with markings on the bayonet assembly 210 for a desired degree of beam spread; for instance, FIG. 11A showing notch 228 aligned with "15" for a 15-degree beam spread. Each of the various beam spread adjustment locations is clearly marked on bayonet.

In more detail, a user inserts bayonet assembly 210 into receiver assembly 212 as shown in any of FIGS. 11A–11C until the bayonet assembly reaches a full stop within receiver assembly 210. The user then rotates the bayonet assembly relative to the receiver assembly in the direction of an arrow 230 until a full rotational stop is reached, at which point the bayonet assembly becomes locked to the receiver assembly. For the embodiment shown, the rotation of bayonet assembly 210 relative to receiver assembly 212 is $\frac{1}{12}^{th}$ turn, or 30 degrees.

The foregoing lock-in adjustment location ability of the bayonet & receiver assembly arrangement is made possible by appropriate contouring of the confronting surfaces of the bayonet assembly 210 and receiver assembly 212. With reference to FIG. 12, bayonet assembly 210 uses an axial stop ledge 232 and circumferential lock flange 234 that extend radially outwards from a substantially cylindrical surface 236, which is a surface that radially bears against cooperating surfaces of receiver assembly 212. Axial stop ledge 232 is axially aligned with lock flange 232. The additional geometric structures on the bayonet assembly (e.g., 237) allow for clearance for different beam-spread positions and may also block contaminants, as described below.

At this point, it should be noted that the described radially outwardly facing surface of bayonet assembly 210 forms a pattern from about 180 degrees about a longitudinal axis 238 of the assembly, which pattern repeats for the other approximately 180 degrees about such longitudinal axis. This same approximately 180-degree repeating of patterns applies also to receiver assembly 212.

Now, referring to receiver assembly 212 of FIGS. 13A and 13B, receiving channels 240, circumferential flange stops 242 and axial positioning pads 244 are shown extending radially inwardly from a generally cylindrical surface 246. Flange stops 242 and positioning pads 244 are mounted on a radial bearing region 245, which extends towards axis 238 from surface 246. Radial bearing surface 245 supports radial bearing loads when the bayonet assembly is inserted into the receiver assembly, and structurally supports positioning pads 244. Another function of radial bearing surface 245 will be described below.

During insertion of bayonet assembly 210 (FIG. 12) into receiver assembly 212 (FIG. 13A), circumferential lock flange 234 (FIG. 12) is guided into a receiving channel 244 (FIG. 13A), such as vertically middle-shown channel 244, until axial stop ledge 232 (FIG. 12) abuts the vertically lowermost-shown positioning pad 244 (FIG. 13A). At this point, bayonet assembly 210 is then turned 30° clockwise relative to receiver assembly 212 so that circumferential lock flange 234 (FIG. 12) passes a cam lock point (or projection) 248 (FIG. 13B) to lock the circumferential lock flange against a circumferential flange stop. In this position (not shown), a positioning pad 244 (FIG. 13A) is sandwiched in the axial space between circumferential stop flange 234 and axial stop ledge 232. This operation can be more easily understood with reference to FIGS. 14A–14B and 15A–15C.

Figure 14A:
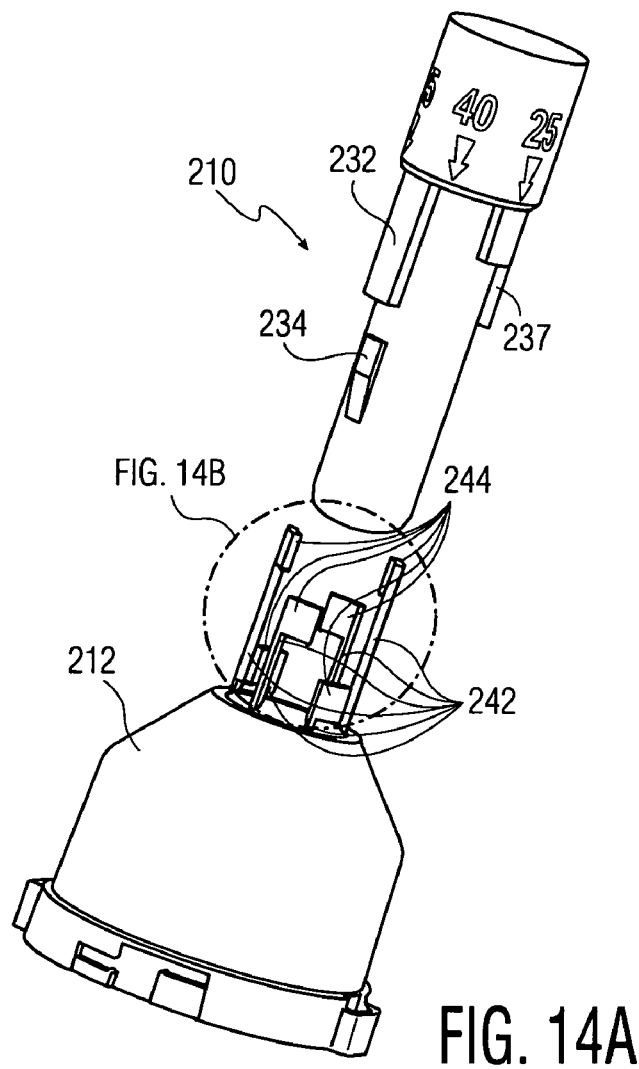
FIG. 14A is a perspective view of a bayonet assembly and a receiver assembly, with the receiver assembly shown without the surface on which positioning pads and circumferential flange stops are mounted, for simplicity of illustration.
Figure 14B:
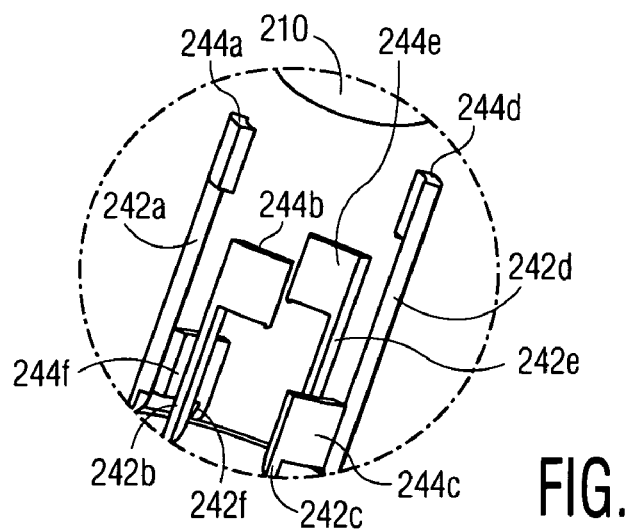
FIG. 14B is an enlargement of the circled portion in FIG. 14A labeled FIG. 14B.

As in FIG. 12, FIG. 14A shows bayonet assembly 210 with axial stop ledge 232, circumferential flange lock 234 and additional structure 237. As in FIG. 13A, FIG. 14A also shows receiver assembly 212 with circumferential flange stops 242 and axial positioning pads 244. However, FIG. 14A has been simplified by omitting the mounting surface for these stops 242 and pads 244, as is shown at 244 in FIG. 13A; and FIG. 14B shows these structures as six stops 242a–242f and six pads 244a–244f. For practicality, it is preferred that the number of stops and pads be four, six (as shown) or eight.

With the foregoing structure in mind, the selection of a 15-degree beam spread is shown in FIGS. 15A–15C. FIG. 15A shows the insertion of circumferential lock flange 234 into the receiving channel 240 between axial positioning pads 244a and 244b. FIG. 15B shows the final extent of insertion of lock flange 234, when axial stop ledge 232 abuts axial positioning pad 244a. Then, bayonet assembly 210 is then rotated 30 degrees clockwise relative to receiver assembly 212, as shown in FIG. 15C, at which point axial positioning pad 244b is sandwiched between axial stop ledge 232 and circumferential lock flange 234. At this point, also, axial stop ledge 232 stops rotating since it then abuts circumferential flange stop 242a. At this point, finally, as shown in the detail view of FIG. 15D, lock flange 234 has rotated past a cam lock projection 254 on positioning pad 244b, which locks in the bayonet assembly relative to the receiver assembly at the 15-degree beam spread position.

Figure 15E:
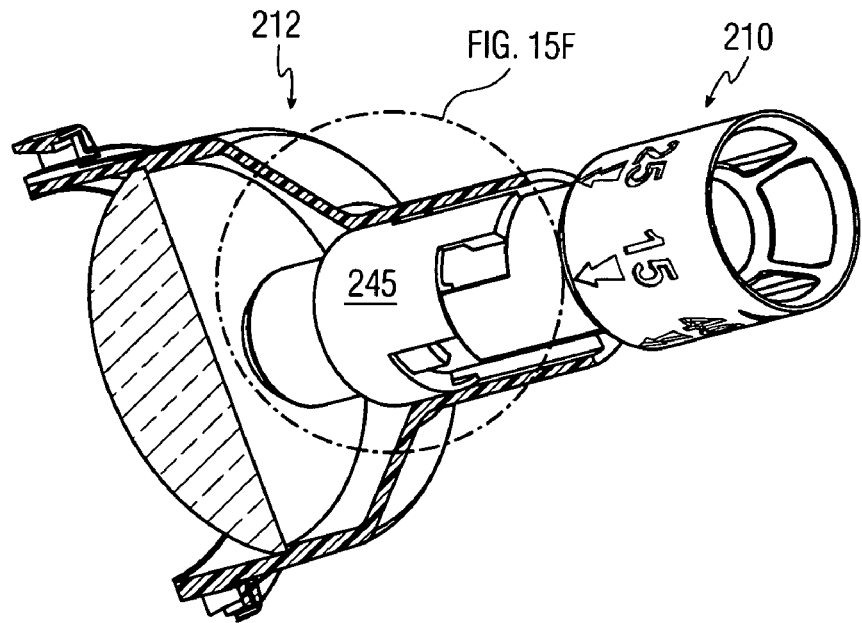
FIG. 15E is a perspective view of a portion of the bayonet and receiver assemblies of FIG. 15, partially in cross section, with an outer portion of the bayonet assembly removed to show more clearly a radial-bearing region.
Figure 15F:
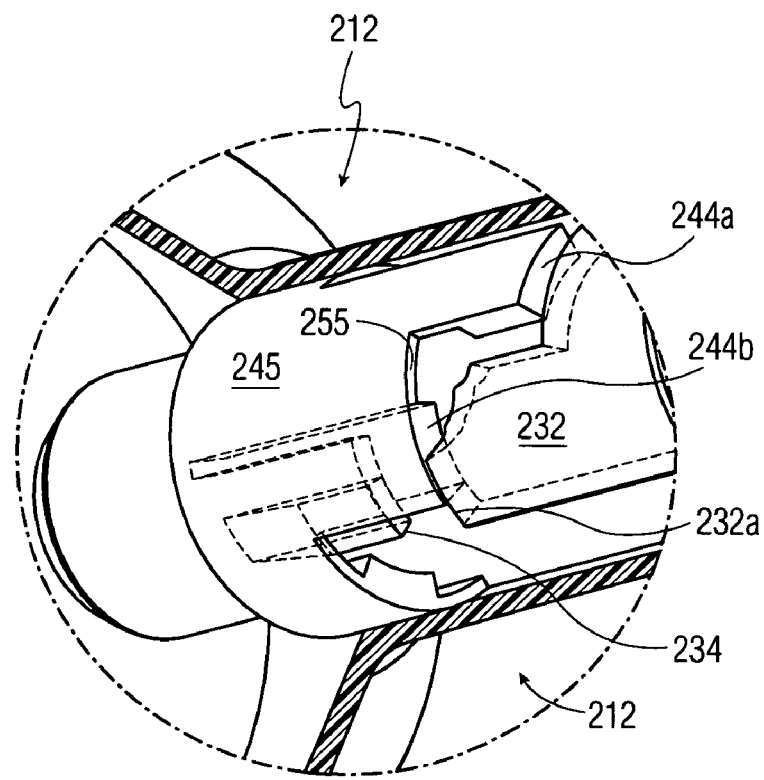
FIG. 15F is an enlargement of the circled portion in FIG. 15E labeled FIG. 15F, shown partially broken away.

FIG. 15E shows bayonet assembly 210 and receiver assembly 212. This Figure shows assembly 212 partially in cross section and with an outer portion removed to show more clearly radial-bearing region 245, described above in connection with FIG. 13A. The enlarged view of FIG. 15F shows radial-bearing region 245 of receiver assembly 212 supporting positioning pads 244a and 244b. It further shows circumferential lock flange 234 of bayonet assembly 212 extending axially past positioning pad 244b, and circumferentially positioned so that it has started to pass under positioning pad 244b. Surface 232a of axial stop ledge 232 of the bayonet assembly axially abuts positioning pad 244b, similar to the position shown in FIG. 15B. Part of surface 232a, shown broken away, also abuts a portion of an annular shelf 255 of radial-bearing region 245. Upon rotating bayonet assembly 210 (FIG. 15E) clockwise in relation to receiver assembly (such rotation not shown in FIG. 15F), when viewing from right to left in FIG. 15F, surface 232a of stop ledge 232 continues to abut, and be supported by, annular shelf 255. Preferably, annular shelf 255 of radial-bearing region 245 forms a continuous annular surface with positioning pad 244b, which continuous annular surface fully supports the entire surface 232a of ledge 232. This provides a stable coupling between the bayonet and receiver assemblies, and help assure that the locking action described above in connection with FIG. 13B will reliably occur.

In the embodiment illustrated herein, annular shelves such as that shown in FIG. 15F at 255 are associated with positioning pads 244b and 244c (FIG. 14B), but not with positioning pad 244a.

The above-described bayonet assembly 210 and receiver assembly 212 were designed as molded components, with bayonet assembly 210 of polycarbonate plastic and receiver assembly of platable ABS, as mentioned above. This provides low cost and an easily reproducible product.

Figure 15G:
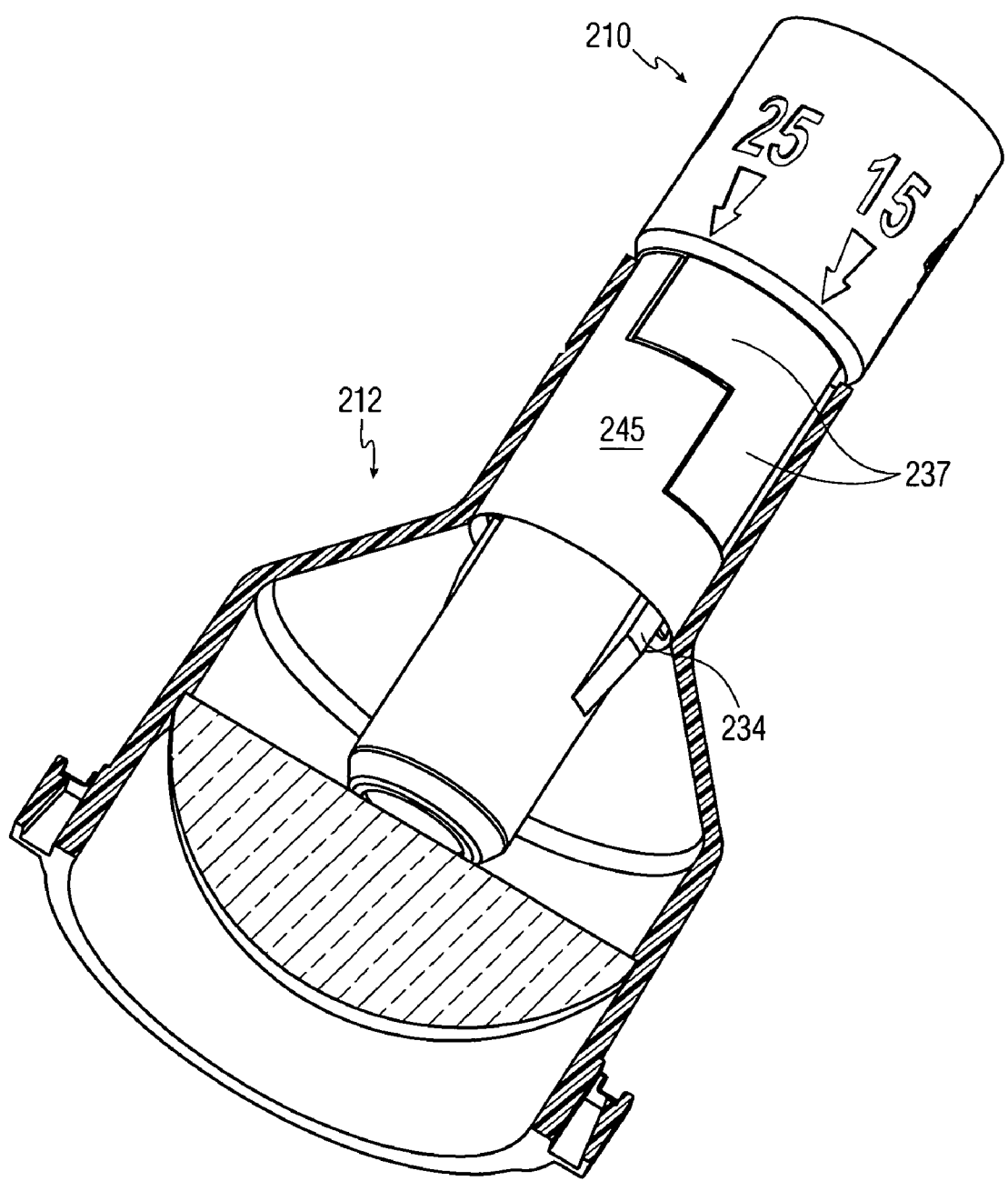
FIG. 15G is a perspective view of the bayonet and receiver assemblies of FIG. 15. The figure shows the receiver assembly partially in cross section and with an outer portion removed in the vicinity of the bayonet assembly to portray more clearly a radial-bearing section of the receiver assembly.

In addition, in the one of the three beam-spread positions in which the bayonet assembly is inserted the furthest into the receiver assembly, the present design blocks contaminants from reaching the light pipe. In particular, such interstices are configured to block any direct path for contaminants to reach the light-dispensing end of the light pipe when the bayonet assembly is locked in position with the receiver assembly. This is shown in FIG. 15G, wherein structure 237 of bayonet assembly cooperates with radial-bearing region 245 of the receiver assembly to block a direct path for contaminants to reach the light pipe when the bayonet and receiver assemblies are locked together. Thus, although not sealed, the foregoing design is considered closed, since it does not allow a direct path for dust, spray, or insects to reach the light pipe end.

Many earlier designs were abandoned because the components were not easily moldable.

The receiver assembly, in particular, was the most difficult to design for molding as a component that was closed to contaminants as described above. The small bore size of the receiver assembly's area for receiving the bayonet assembly—typically about 20 mm—made any common undercut (or snap pocket) impossible to mold. Although the use of exterior inserted slide cores in a mold would have made the bayonet and receiver assemblies easy to make and effective, the receiver assembly's bore size needed to be kept small to keep the costs of the components and associated tooling reasonable and practical, as well to allow for mounting practical component sizes.

The illustrated design of the bayonet and receiver assemblies allows for the successful molding of these components, as well as maintaining the small bore size and closure of any direct path for contaminants to reach the light pipe end.

While the invention has been described with respect to specific embodiments by way of illustration, many modifications and changes will occur to those of ordinary skill in the art. It is, therefore, to be understood that the appended claims are intended to cover all such modifications and changes as fall within the true scope and spirit of the invention.

What is claimed is:

1. An adjustable-aim light pipe fixture, comprising:
  a) a generally spherical eyeball for receiving an end of a light pipe; the eyeball having a longitudinal axis coincident with a longitudinal axis of that portion of the light pipe that is received in the eyeball;
  b) a single mounting arrangement for containing within the eyeball both the end of the light pipe and the entirety of an optical-focusing element;
  c) a socket for holding the eyeball; the socket comprising a first retainer ring and a second retainer ring;
  d) each retainer ring having an interior surface with contact points to an outer surface of the eyeball;
  e) the first and second retainer rings being oriented with respect to each other so as to hold the eyeball in a fixed position when the first and second rings are pressed towards each other; and f) a clamping structure for clamping the first and second rings against each other in such manner as to hold the eyeball in fixed relation to the first retainer ring.

2. The light pipe of claim 1, wherein the contact points span a sufficient angle, measured from a center of the eyeball along the longitudinal axis of the eyeball, so as to prevent the respective interior surfaces of each retainer ring, when compressed against the eyeball, from physically damaging the finish of the eyeball.

3. The light pipe of claim 1, wherein a pair of edges of each retainer ring closest to the outer surface of the eyeball does not contact said outer surface of the eyeball.

4. The light pipe of claim 1, wherein the contact points occupy a sufficient area of the eyeball so as to prevent the respective interior surfaces of each retainer ring, when compressed against the eyeball, from physically damaging the finish of the eyeball.

5. The light pipe of claim 4, wherein a pair of edges of each retainer ring closest to the outer surface of the eyeball does not contact said outer surface of the eyeball.

6. The light pipe of claim 1, wherein each ring has an interior surface substantially conforming to an outer surface of the eyeball.

7. The light pipe fixture of claim 2, wherein:
  a) the first retainer ring is integrally joined to a mounting plate for mounting the eyeball; and
  b) adjustment means for the clamping structure is accessible from the side of the mounting plate distant from an equator of the eyeball situated between said contact points that are associated with the first retainer ring and said contact points that are associated with the second retainer ring.

8. The light pipe fixture of claim 7, comprising a hinge between adjacent portions of the first and second rings.

9. The light pipe fixture of claim 8, wherein the clamping structure further comprises a screw accessible from the side of the plate distant from the equatorial region.

10. The light pipe fixture of claim 9, wherein the hinge comprises a longitudinal hinge member on one of the first and second rings; said hinge member being received within a slot in the other ring.

11. An adjustable-aim light pipe fixture, comprising:
  a) a generally spherical eyeball for receiving an end of a light pipe; the eyeball having a longitudinal axis coincident with a longitudinal axis of that portion of the light pipe that is received in the eyeball;
  b) a socket for holding the eyeball; the socket comprising a first retainer ring and a second retainer ring;
  c) each retainer ring having an interior surface with contact points to an outer surface of the eyeball;
  d) the first and second retainer rings being oriented with respect to each other so as to hold the eyeball in a fixed position when the first and second rings are pressed towards each other;
  e) a clamping structure for clamping the first and second rings against each other in such manner as to hold the eyeball in fixed relation to the first retainer ring;
  f) wherein the first retainer ring is affixed to a mounting plate for mounting the eyeball; and
  g) a pair of opposing mounting frame members; each mounting frame member having a respective ledge for supporting an opposite end of one or more mounting plates.

12. The light pipe fixture of claim 11, wherein the light pipe fixture includes a pair of opposing mounting frame members; each mounting frame member having a respective groove for receiving an opposite side of one or more mounting plates.

13. The light pipe fixture of claim 12, wherein the first and second frame members are integrally formed together in a generally U-shaped configuration.

14. The light pipe fixture of claim 12, further comprising a spacer adjacent to a mounting plate and having opposing sides, each of which is received in a respective ledge of one of the opposing mounting frame members.

15. The light pipe fixture of claim 14, wherein an illuminator is mounted on the spacer.

16. The light pipe fixture of claim 12, further comprising a spacer adjacent to a mounting plate and having opposing sides, each of which is received in a respective groove of one of the opposing mounting frame members.

17. The light pipe fixture of claim 16, wherein an illuminator is mounted on the spacer.

18. An adjustable-aim light pipe fixture, comprising:
  a) a generally spherical eyeball for holding the end of a light pipe;
  b) a socket for holding the eyeball; the socket comprising a first retainer ring and a second retainer ring;
  c) the first and second retainer rings being shaped in such manner as to hold the eyeball in a fixed position when the first and second rings are pressed towards each other;
  d) a clamping structure for pressing the first and second rings towards each other to hold the eyeball in fixed relation to the first retainer ring; and
  e) the eyeball including a single mounting arrangement for holding within the eyeball both the end of the light pipe and at least a part of an optical-focusing element; said mounting arrangement holding the end of the light pipe in fixed relation to the optical element; the mounting arrangement being rotatably received in the eyeball.

19. The light pipe fixture of claim 18, wherein the light pipe comprises a monofilament fiber optic cable.

20. The light pipe fixture of claim 18, further comprising means for temporarily locking the mounting arrangement in fixed relation to the eyeball.

21. The light pipe fixture of claim 18, wherein the eyeball comprises an outer, generally spherical surface formed from a pair of identical, molded parts that are symmetrical about an axis coinciding with a main optical axis of the end of the light pipe.

22. The light pipe fixture of claim 21, wherein:
  a) the mounting arrangement includes a flange extending outwardly with respect to the longitudinal axis of the end of the light pipe; and
  b) the pair of molded parts includes an annular groove with an inner opening for receiving the flange, for holding the mounting arrangement in the eyeball.

23. The light pipe fixture of claim 18, wherein the mounting arrangement comprises:
  a) a bayonet assembly having a generally tubular coupling for receiving the end of a light pipe; and
  b) a receiver assembly having:
    i) a generally tubular coupling for lockingly receiving therewithin the bayonet assembly coupling at a plurality of predetermined adjustable levels of penetration of the bayonet assembly coupling within the generally tubular coupling;
    ii) an optical lens; and
    iii) a hollow portion for focusing a light beam from the end of the light pipe through the lens.

24. The light pipe fixture of claim 23, wherein a radial interior surface of the receiver assembly coupling and a radial exterior surface of the bayonet assembly coupling are so configured that the receiver assembly coupling slidably and lockingly receives the bayonet assembly coupling in any of a plurality of predetermined positions along the length of the receiver assembly coupling, so as to allow for different predetermined distances between the end of the light pipe an the lens; said plurality of positions being along the length of the receiver assembly coupling, so as to allow for different discrete distances between the end of the fiber and the lens.

* * * * *